(12) United States Patent
Rubin et al.

(10) Patent No.: US 10,116,441 B1
(45) Date of Patent: Oct. 30, 2018

(54) ENHANCED-SECURITY RANDOM DATA

(71) Applicant: Amazon Technologies, Inc., Seattle, WA (US)

(72) Inventors: Gregory Alan Rubin, Seattle, WA (US); Matthew John Campagna, Bainbridge Island, WA (US); Gregory Branchek Roth, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 181 days.

(21) Appl. No.: 14/737,471

(22) Filed: Jun. 11, 2015

(51) Int. Cl.
*G06F 21/00* (2013.01)
*H04L 9/08* (2006.01)
*G06F 7/58* (2006.01)
*H04K 1/00* (2006.01)
*H04L 9/00* (2006.01)
*H04L 9/38* (2006.01)

(52) U.S. Cl.
CPC ............ *H04L 9/0869* (2013.01); *G06F 7/582* (2013.01); *H04L 2209/24* (2013.01)

(58) Field of Classification Search
None
See application file for complete search history.

(56) References Cited

U.S. PATENT DOCUMENTS

| | | | |
|---|---|---|---|
| 5,732,138 A | 3/1998 | Noll et al. | |
| 6,195,669 B1 | 2/2001 | Onodera et al. | |
| 6,253,223 B1 | 6/2001 | Sprunk | |
| 6,275,586 B1 | 8/2001 | Kelly | |
| 6,321,333 B1 | 11/2001 | Murray | |
| 6,628,786 B1 | 9/2003 | Dole | |
| 6,862,605 B2 | 3/2005 | Wilber | |
| 6,947,960 B2 | 9/2005 | Hars | |
| 7,010,681 B1 * | 3/2006 | Fletcher | H04L 63/0428 713/154 |
| 7,210,035 B2 | 4/2007 | Doyle et al. | |
| 7,269,614 B2 | 9/2007 | Wells et al. | |
| 7,395,430 B2 | 7/2008 | Gupta | |
| 7,516,169 B2 | 4/2009 | Collier | |
| 7,930,332 B2 | 4/2011 | Acar et al. | |
| 8,015,224 B1 | 9/2011 | Chaichanavong et al. | |
| 8,019,802 B2 | 9/2011 | Rose et al. | |
| 8,185,473 B2 | 5/2012 | Ginter et al. | |
| 8,219,819 B2 | 7/2012 | Little | |
| 8,266,425 B2 | 9/2012 | Fahn et al. | |

(Continued)

OTHER PUBLICATIONS

Oded Goldreich, et al., "How to Construct Random Functions", Journal of the Association for Computing Machinery, Oct. 1986, pp. 792-807, vol. 33, No. 4.

(Continued)

*Primary Examiner* — Eric Chen
(74) *Attorney, Agent, or Firm* — Robert C. Kowert; Meyertons, Hood, Kivlin, Kowert & Goetzel, P.C.

(57) ABSTRACT

A requirement for a pseudo-random number is identified. A usage context corresponding to the requirement is determined from among a plurality of usage contexts. A cryptographic transformation function is applied to a first pseudo-random number obtained from a pseudo-random number generator. The transformation function meets a security criterion which is based on the usage context. A result of the function is used to fulfill the requirement.

23 Claims, 11 Drawing Sheets

(56) References Cited

U.S. PATENT DOCUMENTS

| | | | |
|---|---|---|---|
| 8,312,528 B2 | 11/2012 | Saarepera et al. | |
| 8,566,377 B2 | 10/2013 | Harris et al. | |
| 8,606,834 B2* | 12/2013 | Thomas | H04L 9/002 |
| | | | 702/179 |
| 8,683,052 B1 | 3/2014 | Brinskelle | |
| 8,788,552 B2 | 7/2014 | Vijayarangan et al. | |
| 9,049,232 B2 | 6/2015 | Potlapally et al. | |
| 2002/0107897 A1* | 8/2002 | Collier | G06F 7/582 |
| | | | 708/250 |
| 2002/0165824 A1 | 11/2002 | Micali | |
| 2004/0059767 A1 | 3/2004 | Liardet | |
| 2004/0248549 A1 | 12/2004 | Drews | |
| 2005/0135625 A1* | 6/2005 | Tanizawa | H04L 63/0428 |
| | | | 380/270 |
| 2005/0138386 A1 | 6/2005 | Le Saint | |
| 2006/0050870 A1* | 3/2006 | Kimmel | H04L 63/0428 |
| | | | 380/30 |
| 2007/0058814 A1* | 3/2007 | Robinson | H04L 9/0662 |
| | | | 380/280 |
| 2007/0189534 A1 | 8/2007 | Wood et al. | |
| 2007/0230693 A1* | 10/2007 | Mueller | G06F 7/582 |
| | | | 380/46 |
| 2007/0230694 A1 | 10/2007 | Rose et al. | |
| 2008/0019514 A1* | 1/2008 | Stromberg | H04L 63/06 |
| | | | 380/46 |
| 2008/0022039 A1* | 1/2008 | Luo | G06F 7/588 |
| | | | 711/112 |
| 2009/0144351 A1 | 6/2009 | Rueping et al. | |
| 2009/0262928 A1* | 10/2009 | Busari | G06F 7/588 |
| | | | 380/46 |
| 2009/0323955 A1* | 12/2009 | Ikushima | H04L 9/0852 |
| | | | 380/268 |
| 2010/0002877 A1* | 1/2010 | Zhang | H04L 9/0662 |
| | | | 380/46 |
| 2010/0121896 A1 | 5/2010 | Oram | |
| 2010/0278338 A1* | 11/2010 | Chang | G09C 1/00 |
| | | | 380/200 |
| 2011/0289309 A1* | 11/2011 | Tanenbaum | H04L 9/0825 |
| | | | 713/150 |
| 2012/0177036 A1 | 7/2012 | Olesinski et al. | |
| 2012/0221615 A1 | 8/2012 | Cerf et al. | |
| 2012/0311703 A1 | 12/2012 | Yanovsky et al. | |
| 2013/0325918 A1* | 12/2013 | Sherwood | G06F 7/58 |
| | | | 708/250 |
| 2014/0129602 A1* | 5/2014 | Nam | G06F 7/58 |
| | | | 708/250 |
| 2014/0136853 A1* | 5/2014 | Fukuda | H04L 63/0428 |
| | | | 713/189 |
| 2014/0280411 A1* | 9/2014 | Rose | G06F 7/58 |
| | | | 708/250 |
| 2015/0244685 A1* | 8/2015 | Shah | G06F 21/602 |
| | | | 713/155 |
| 2015/0333906 A1* | 11/2015 | Rahman | G06F 7/58 |
| | | | 380/44 |
| 2015/0355886 A1* | 12/2015 | Peeters | G06F 7/588 |
| | | | 708/250 |
| 2016/0037345 A1* | 2/2016 | Margadoudakis | H04L 63/0853 |
| | | | 455/411 |
| 2016/0294802 A1* | 10/2016 | Xiao | H04L 63/083 |
| 2016/0379205 A1* | 12/2016 | Margadoudakis | G06Q 20/327 |
| | | | 705/71 |

OTHER PUBLICATIONS

Yevgeniy Dodis, et al., "How to Eat Your Entropy and Have it Too Optimal Recovery Strategies for Compromised RNGs", Cryptology ePrint Archive, 2014, pp. 1-2.

Oded Goldreich, et al., "On the Cryptographic Applications of Random Functions", Springer-Verlag Berlin Heidelberg, 1985, pp. 276-288.

http://en.wikipedia.org/wiki/Fortuna_%28PRNG%29, "Fortuna (PRNG)", Downloaded Apr. 3, 2015, pp. 1-3.

H. Krawczyk, et al., "HMAC: Keyed-Hashing for Message Authentication", RFC, Feb. 1997, pp. 1-11.

Elaine Barker, et al., "Recommendation for Random Number Generation Using Deterministic Random Bit Generators", National Institute of Standards and Technology, Jan. 2012, 1-128, Special Publication 800-90A.

"What's This Fuss About True Randomness" RANDOM.org, downloaded Dec. 11, 2012 pp. 1-3.

Elaine Barker, et al., "Recommendation for Random Bit Generator (RBG) Constructions" Draft NIST Special Publication 800-90C Aug. 2012, pp. 1-50.

Elaine Barker, et al., "Recommendation for the Entropy Sources Used for Random Bit Generation" NIST DRAF Special Publication 800-90B Aug. 2012, pp. 1-78.

Brain Carrier, "Hash Database Help" downloaded on Mar. 8, 2013 from www.sleuthkit.org/autopsy/help/hash_db.html, pp. 1-2.

"IP/Domain Lookups" downloaded on Mar. 8, 2013 from www.barracudacentral.org/lookups, 2009-2012 Barracuda Networks, p. 1.

"CioudCracker" downloaded on Mar. 8, 2013 from www.cloudcracker.com, 2012 Thoughtcrime Labs, pp. 1-2.

Dan Brown "Convergence: Another Way to Trust" downloaded on Mar. 8, 2013 from blog.bit9.com/2011/08/05/convergence-another-way-to-trust/, published Aug. 5, 2011 pp. 1-7.

Nadia Heninger, et al "Widespread Weak Keys in Network Devices" downloaded on Mar. 7, 2013 from factorable.net p. 1.

"IDefense Security Intelligence Services" downloaded Mar. 8, 2013 from www.verisigninc.com/en_US/products-and-services/network-intelligence-availability/idefense/index.xhtml, 2011-2013 VeriSign, Inc pp. 1-2.

"Web Security" downloaded Mar. 8, 2013 from www.mcafee.com/us/products/email-and-web-security/web-security.aspx pp. 1-5.

"Perspectives Project—What is Perspectives" downloaded Mar. 8, 2013 from perspectives-project.org pp. 1-3.

"Debian Wiki—Identifying Weak Keys" downloaded Mar. 8, 2013 from wiki.debian.org/ SSLkeys#Identifying_Weak_Keys pp. 1-19.

"Symantec Certificate Intelligence Center—Centralized SSL Discovery and Management Service for the Enterprise" downloaded Feb. 25, 2013 from www.symantec.com/verisign/ssl-certificates/certificate-intelligence-center?inid=vrsn_symc_ssi_CIC, published Feb. 21, 2013 pp. 1-3.

"The EFF SSL Observatory" downloaded Mar. 8, 2013 from https://www.eff.org/observatory published Aug. 3, 2010, pp. 1-2.

Nadia Heninger, et al "Mining Your Ps and Qs: Detection of Widespread Weak Keys in Network Devices" Proceedings of the 21st USENIX Security Symposium, published Jul. 2, 2012, pp. 1-16.

U.S. Appl. No. 13/826,888, filed Mar. 14, 2013, Nachiketh Rao Potlapally et al.

U.S. Appl. No. 13/781,289, filed Feb. 28, 2013, Nachiketh Rao Potlapally et al.

* cited by examiner

1

ENHANCED-SECURITY RANDOM DATA

BACKGROUND

Numerous types of computing applications and protocols rely on the use of random data. For example, random (or, more accurately, pseudo-random) numbers may be used for generating cryptographic keys, certificates, or other cryptographic artifacts such as initialization vectors and nonces that are in turn used in large numbers of transactions carried out over public and/or private networks. Such cryptographic artifacts are the bases of the trust placed in security algorithms by millions of end users and service providers, and are fundamental for providing data confidentiality, authentication and integrity. The vast majority of Internet-based services, which may cumulatively result in billions of dollars of business revenue annually, rely on the use of random data to implement some of the core infrastructure technologies used for those services. Government agencies such as revenue collection services and/or research establishments also utilize security algorithms dependent upon random data for critical operations. Random numbers may also be used for a variety of other purposes, such as for generating unique identifiers, sequence numbers used in networking and other protocols, back-off delay intervals and the like. In some of these other use cases, the random numbers generated by a given source may be accessible by a number of different entities.

The extent to which the applications and systems using random numbers for security-related purposes are truly secure may depend upon the quality of the random numbers. For example, malicious attackers may be able to penetrate the security of a given system if the statistical quality of the random numbers being produced by a random number source of the system is poor (e.g., if there is a predictable correlation between different random numbers being produced by the source over time, and if it is possible to accumulate a sufficient quantity of output from the source to detect the correlation). The quality of the random numbers produced by a random number generator may in turn depend on the quality of its entropy sources (the physical phenomena, assumed to be intrinsically random, which are used to generate the bit sequences used for the random numbers). Unfortunately, random number consumers often have little direct control on the vulnerabilities of the random number generators being used. The problem of poor random number quality may be exacerbated in certain types of environments in which a limited number of random number generators and corresponding entropy sources are used for a variety of applications, some with more stringent security requirements than others.

Figure 1:
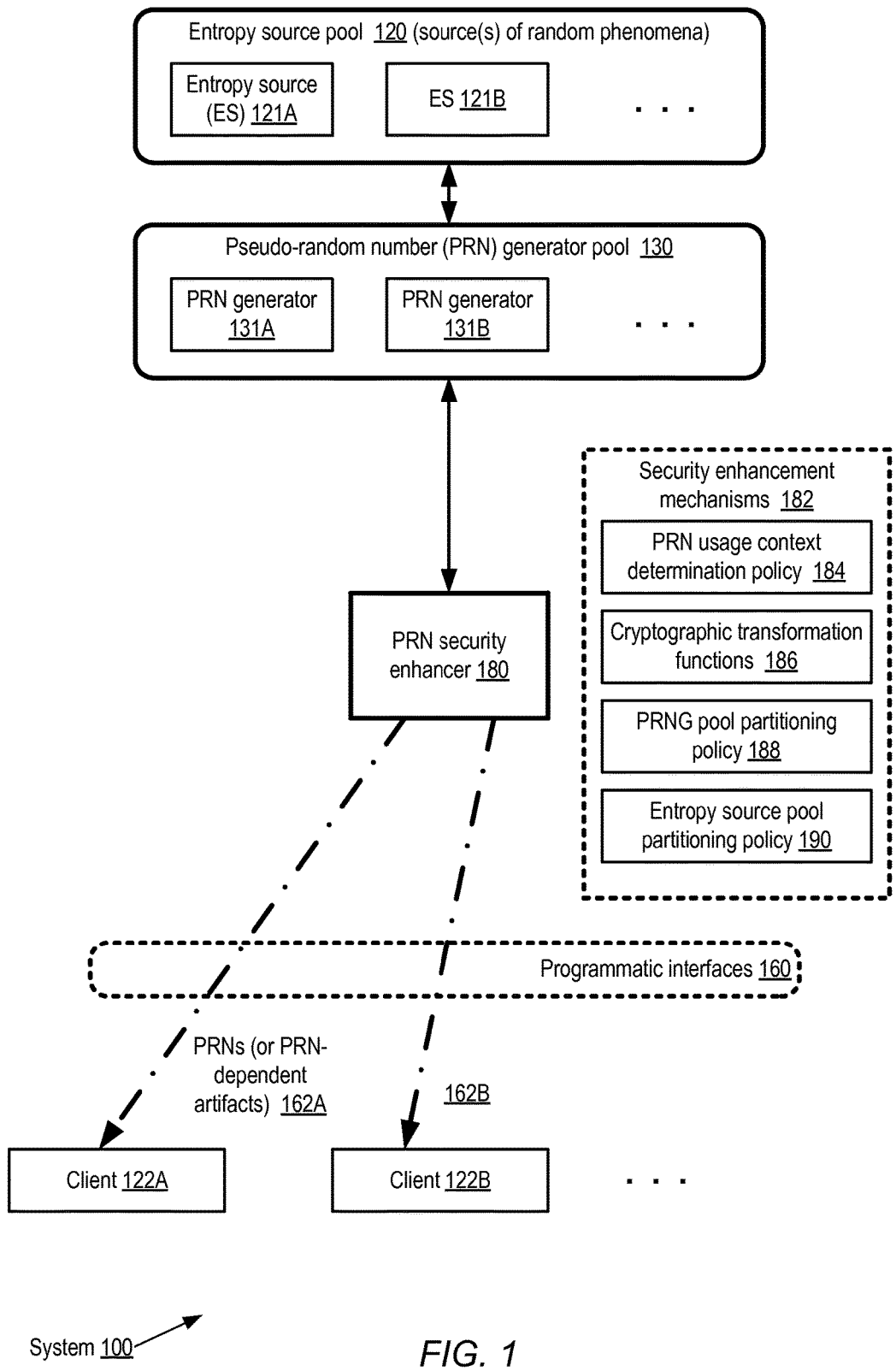
FIG. 1 illustrates an overview of a system in which the security of the random numbers provided to respective consumers may be enhanced using techniques selected based at least in part on the contexts in which the random numbers are to be used, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for enhancing the security properties of pseudo-random numbers (PRNs) derived from the output of one or more pseudo-random number generators (PRNGs) are described. In some embodiments, a PRNG may be implemented using an algorithm which generates a sequence of numbers whose statistical or mathematical properties approximate those of a sequence of "ideal" or "truly" random numbers. The security enhancement techniques described herein may be applied with similar success to true random numbers and their generators in various embodiments; thus, with respect to such embodiments, whether the bit sequences produced natively by the generators are pseudo-random or truly random is immaterial. Accordingly, in the remainder of this document, the terms "random number" and "pseudo-random number" may be used synonymously.

A number of different PRN security enhancement techniques, may be employed singly or in combination at one or more computing devices in various embodiments. One of the security enhancement techniques may include, for example, determining or selecting a usage context corresponding to a given requirement for a PRN, causing one or more cryptographic transformation functions which meet a security criterion associated with the usage context to be applied to a raw or baseline PRN, and using a result of the transformations to fulfill the request. In some embodiments, a key used in such a transformation function may be determined based on the usage context. Another security enhancement technique may involve partitioning a PRNG pool, and using respective pools for PRN requirements with respective usage contexts. The technique or techniques may be applied by different types of entities or components in various embodiments: e.g., by a component at which the requirement for the PRN is identified, or by a different component which has resources required for the technique. In some embodiments, at least some of the techniques may be implemented or initiated at an application responsible for providing PRN-dependent artifacts such as nonces, unique identifiers, networking protocol parameters, security keys, certificates and the like to various clients or PRN consumers. In some cases, such applications may identify requirements for PRNs without receiving explicit requests for the artifacts from other entities. In other embodiments, some of the techniques may be implemented at the PRNGs themselves; PRNGs capable of implementing the techniques may be referred to herein as "modified" PRNGs. The term "baseline PRNs" may be used herein for the original or unmodified PRNs provided by the PRNGs to fulfill identified PRN requirements. The PRNs ultimately provided to the clients or PRN consumers may be termed "response PRNs". In some embodiments, a modified PRNG may identify a requirement for a PRN (e.g., as a result of receiving a request for a PRN), generate a baseline PRN, apply one or more transformations to the baseline PRN, and use the resulting transformed PRN to fulfill the requirement. The net result of the security enhancement techniques which may be used in various embodiments is that it becomes substantially more difficult (or computationally intractable) for a malicious entity to use accumulated output from the PRNGs to make any useful predictions regarding the PRNs that may be provided in the future (or may have been provided in the past) to any other client. Collectively, the devices or modules which implement the security enhancement techniques or cause the techniques to be implemented in various embodiments (such as applications of the kind referred to above and/or modified PRNGs of the kind referred to above) may be referred to as PRN security enhancers (PSEs) herein. According to at least one embodiment, an intermediary device or module may be established between a set of one or more PRNGs (e.g., PRNGs which have not necessarily been modified to enhance security in the manner described above) and the consumers of the PRNs. The intermediary may receive requests for PRNs or for artifacts requiring PRNs, cause one or more of the enhancement techniques to be performed with respect to baseline PRNs generated for the requests, and use the results of the techniques to respond to the requests. Such an intermediary may be referred to herein as a security enhancing intermediary, and may be considered another type of PSE. In some embodiments, the applications responsible for generating the PRN-dependent artifacts may receive PRN requests and provide security-enhanced PRNs in response to the requests. In at least one embodiment, a PRN request for which one or more of the techniques described herein are used may be received from a client at a service provider via a web services interface.

In at least some embodiments, a PSE may determine or select the usage context corresponding to an identified PRN requirement from among numerous usage contexts using a variety of factors, and take different actions based on the usage context. The term "usage context", as used herein, refers to characteristics or properties associated with the intended purpose or use of the response PRNs. Usage contexts may, for example, be distinguished from one another based on the expected or anticipated accessibility levels of the response PRNs and/or on one or more indications of a PRN consumer's identity in various embodiments. PRNs to be used for secret cryptographic keys, which are not expected to cross a security boundary associated with the consumer, may be said to have a "private" or "secret" usage context. PRNs used for other purposes, such as the generation of initial sequence numbers associated with various networking protocols, nonce values or initialization vectors used in block cipher protocols, or the generation of identifiers such as GUIDs (globally unique identifiers), may be characterized as having a "public" usage context, since the PRNs produced for such purposes may at least in principle be accessible by or shared among a variety of entities. A third usage context, "semi-public", may be defined in some embodiments based on anticipated accessibility. Access to PRNs provided in response to semi-public requirements may be restricted to a limited set of entities or security boundaries determined by the PRN consumers (e.g., entities that have established encrypted network connections with the consumers) or by the PSEs, and may not be shared in the same way as the "public" PRNs described above.

With respect to consumer identity, any combination of various types of metadata associated with a PRN requirement may be used for usage context determination. For example, a user identifier associated with the requirement, a client account associated with the requirement, a process/thread identifier of the process or thread at which the PRN is to be consumed, an IP address of a PRN requester, and/or identifier of an application instance, host or virtual machine on whose behalf the PRN is to be produced, may be used for identity-based usage context determination. In at least some embodiments, the set of possible usage contexts may be effectively infinite—e.g., each requirement or request for a PRN may be considered unique, and may therefore be assigned a unique usage context. In at least some embodiments, a combination of anticipated accessibility level and requester identity may be used for distinguishing among PRN usage contexts. In one embodiment, the particular programmatic interface (e.g., application programming interface or API) used as an indication of a PRN requirement may be used to infer its accessibility level and/or the identity of the requester, and the API may therefore serve as an indicator of usage context. Based at least in part on the usage context identified for a particular PRN request, a PSE may select a particular PRNG from a plurality of available PRNGs in some embodiments as the source of a baseline PRN to be used to fulfill the request. In addition or instead of using the usage context to select a source PRNG, in at least one embodiment the usage context may be used to select and/or implement a transformation function for one or more baseline PRNs. For example, the usage context may be used to select a particular transformation key to be used in a cryptographic transformation function (CTF) applied to a baseline PRN in some embodiments, and a result of the CTF may be provided as a response PRN. The key may be selected from a set of pre-generated keys, using the usage context as a selector in some embodiments. In other embodiments, the key may be generated dynamically instead of being selected from a pre-generated set of keys. The particular CTF to be applied for fulfilling a given PRN requirement may be selected from a set of available functions based on the usage context of the requirement in some embodiments. For example, respective families of transformation functions F1 and F2 may be accessible to a PSE in one embodiment, with F1 comprising {CTF1, CTF2} and F2 comprising {CTF3, CTF4}. The families F1 and F2 may differ in the kind of transformations used (e.g., F1 may involve encryption, while F2 may involve hashing). CTFs of a given family may differ in the level of security provided—e.g., CTF1 may use 128-bit keys, while CTF2 may use 256-bit keys. In some such scenarios, the particular family (and/or the particular CTF of the family) used for a PRN requirement may be selected based on the usage context. Thus, in various embodiments in which PRN requirements are categorized based on usage context, the usage contexts may be used for PRNG source selection, secure transformation of baseline PRNs, or both source selection and transformation. Such context-based security policies may help to ensure that PRNs associated with a given usage context cannot be used to make useful predictions regarding the PRN streams provided for other usage contexts, or at least to significantly reduce the probability of successful security attacks across usage contexts. Usage context-dependent fulfillment of PRN requirements may also be referred to herein as "output segregation" of the PRNs provided to PRN consumers.

In at least one embodiment, a PSE may employ a somewhat different approach, in which to fulfill a requirement for a single PRN, multiple PRNs may be utilized. For example, in response to a request for a PRN comprising n bits, two separate PRNs may be obtained from a pool of one or more PRNGs: a baseline n-bit PRN to be transformed (e.g., via encryption using a selected algorithm) before being provided to the requester, and a second k-bit PRN to be used as a transformation key for the baseline n-bit PRN. Both PRNs may be passed as input parameters to a cryptographic transformation function (CTF), and the output of the CTF may be used to respond to the request. In at least one embodiment, this approach may be applied to all PRN requirements, regardless of the usage context; for example, a PSE may simply use the two-PRN approach and many not even expend any compute cycles identifying the usage context. In a variation of this scheme employed in some embodiments, a PSE may dynamically generate the transformation key using a PRN, and use the key to transform output of a deterministic function (e.g., a counter). In another variation of the scheme, the baseline PRN and the transformation key may be generated using respective independent entropy sources.

In at least one embodiment, the security enhancement techniques described herein may be implemented at a random data service of a provider network. Networks set up by an entity such as a company or a public sector organization to provide one or more services (such as various types of single-tenant or multi-tenant cloud-based computing or storage services) accessible via the Internet and/or other networks to a distributed set of clients may be termed provider networks in this document. A given provider network may include numerous data centers (which may be distributed across different geographical regions) hosting various resource pools, such as collections of physical and/or virtualized computer servers, storage devices, networking equipment and the like, needed to implement, configure and distribute the infrastructure and services offered by the provider. A number of different hardware and/or software components, some of which may be instantiated or executed at different data centers or in different geographical regions, may collectively be used to implement the PSEs and/or additional underlying infrastructure supporting the random data service in various embodiments. Several different types of random data consumers or clients, such as components of virtualization software, operating system software, user-level applications, and/or software implementing other services of the provider network, may be able to obtain PRNs and/or other randomization-dependent data artifacts of desired quality from the service in various environments in a single-tenant or multi-tenant fashion, e.g., using web-service programmatic interfaces. In at least some embodiments, the PRNs and/or other randomization-based artifacts produced by the random data service may be transmitted to clients using secure communication protocols whose properties may also be selectable or customizable. In one embodiment, PSEs may be implemented simply as encapsulation or wrapper layers added on top of programmatic interfaces usable for obtaining PRNs at various computing platforms; that is, a PSE need not necessarily be implemented as a standalone component of a provider network's random data service.

Overview of Security-Enhanced Random Number Delivery

FIG. 1 illustrates an overview of a system in which the security of the random numbers provided to respective consumers may be enhanced using techniques selected based at least in part on the contexts in which the random numbers are to be used. As shown, system 100 comprises an entropy source pool 120, a pseudo-random number (PRN) generator pool 130, and a PRN security enhancer (PSE) 180. The entropy source pool may, for example, comprise various candidate sources of random phenomena (such as thermal noise or radioactive decay) which can be measured or detected and used to generate corresponding random bit sequences at the PRN generators. Generally speaking, each PRN produced by a PRN generator may consume some amount of entropy, and the amount of entropy obtainable from a given entropy source during any given period of time may be limited. Thus, in various embodiments, the underlying entropy used to prepare PRNs may be considered a constrained resource which limits the quality and/or quantity of the PRNs generated in system 100.

The PSE may implement one or more programmatic interfaces 160 (such as web-services interfaces), which may be used by a plurality of clients 122 such as client 122A and 122B to submit requests for PRNs or for data artifacts that are constructed using PRNs, and/or to receive the corresponding response PRNs or artifacts. As mentioned earlier, in some embodiments PRN requirements may be identified without receiving corresponding requests—e.g., an application may be implementing a security protocol or a networking protocol for which one or more steps require the use of a random number, so a client may not have to send a request for a PRN. In the embodiment shown in FIG. 1, a respective set of PRNs (or artifacts dependent on PRNs) 162 (e.g., 162A and 162B) is provided by the PSE 180 to clients 122 based on respective sets of PRN requirements of the clients. The terms "client" and "PRN consumer" may be used interchangeably herein to refer to entities on whose behalf PRNs are generated. In various embodiments, the PSE 180 may comprise, for example, an application that produces PRN-based artifacts with or without corresponding requests, a modified PRN generator which has been enhanced to implement security enhancement techniques, and/or an intermediary device or module between a PRN generator and the clients 122.

Figure 2:
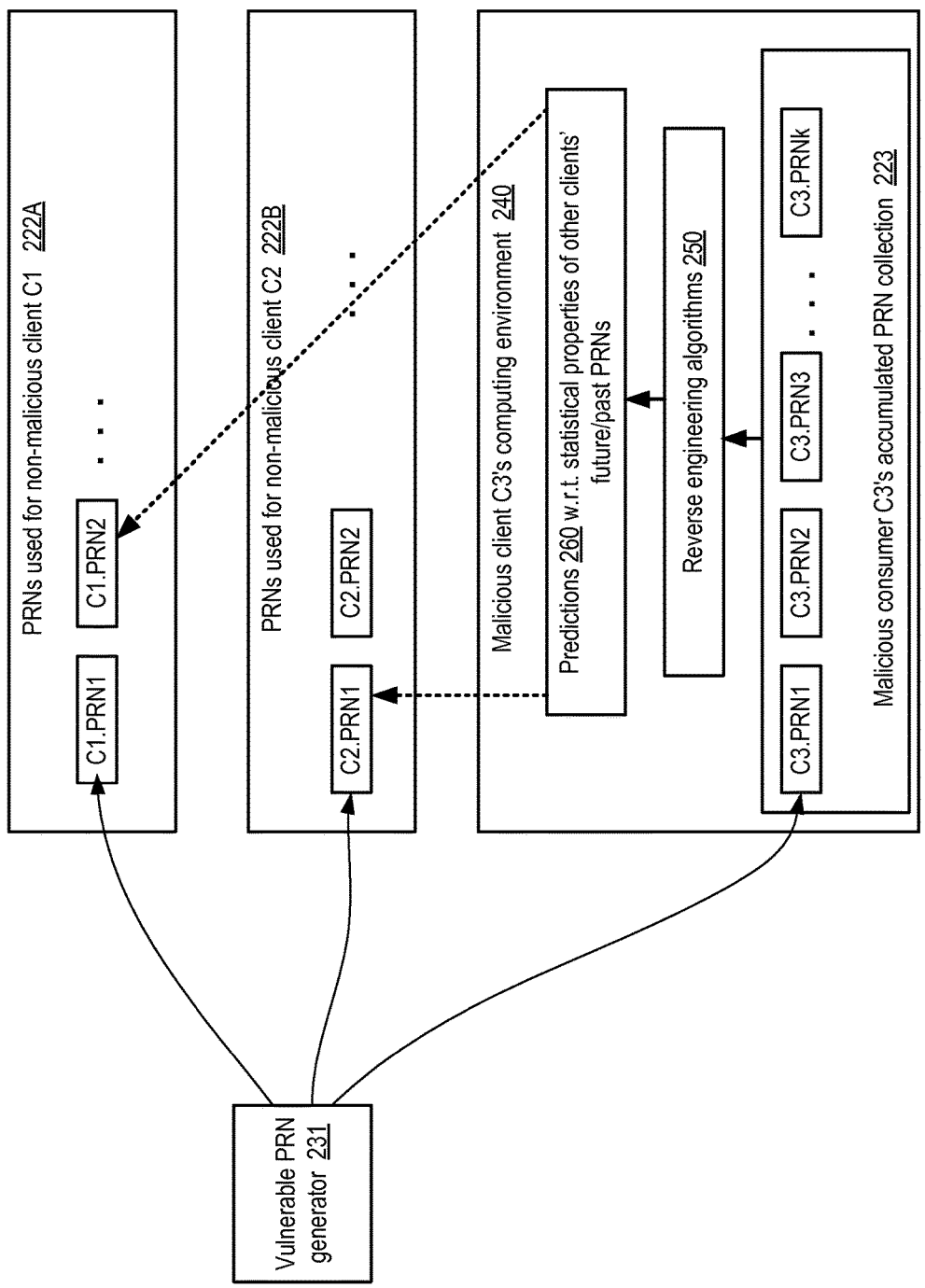
FIG. 2 illustrates an example of a scenario in which a malicious client of a random number generator may be able to predict statistical properties or characteristics of one or more random numbers produced for other clients, according to at least some embodiments.

The PSE may apply some combination of one or more security enhancement mechanisms 182 to generate the PRNs 162 in the depicted embodiment, with the overall goal of preventing any of the clients 122 from being able to make useful predictions regarding PRNs that have been (or will be) provided to any of the other clients. (An example technique which may be attempted by malicious clients to generate such predictions to attack other clients is illustrated in FIG. 2 and described below.) In at least one embodiment, the PSE may classify identified PRN requirements into one or more categories, e.g., based on usage context. Factors such as the anticipated accessibility characteristics of the response PRNs, metadata which indicates the consumer's identity, or some combination of such factors may be used to distinguish between the usage contexts of different requirements. A usage context determination policy 184 may indicate whether or not usage contexts are to be used, and if so, how the contexts are to be determined or characterized. In some embodiments, a multi-level usage context determination procedure may be used—e.g., in a preliminary step for a given PRN requirement, the PSE 180 may determine accessibility characteristics of the PRN, and then in a second step the PSE may further classify the usage contexts based on the PRN consumer's identity. Conversely, usage contexts may be classified first based on identity and then based on expected accessibility in other embodiments.

In embodiments in which PRN usage contexts are determined, they may be used for one or more stages of the preparation of response PRNs. In one embodiment, for example, the PRN generator (PRNG) pool 130 and/or the entropy source pool 120 may be partitioned for different PRN usage contexts. For example, a particular PRNG 131 (e.g., PRNG 131A or PRNG 131B) may be designated to provide baseline or raw PRNs for one usage context, or a set of usage contexts, while a different PRNG 131 may be designated for a different set of one or more usage contexts. In some embodiments, instead of or in addition to designating particular PRNGs for respective usage contexts, the underlying entropy source pool 120 may be partitioned, with respective partitions being used to fulfill requirements with different usage contexts. For example, entropy source 121A may be assigned to usage context UC1, while entropy source 121B may be assigned to usage context UC2. In other embodiments, PRNGs 131 and entropy source 121 may be more tightly coupled, so that partitioning the PRNG pool may automatically result in a corresponding partitioning of the entropy source pool. Any of a number of PRNG pool partitioning policies 188 and/or entropy source pool partitioning policies 190 may be used in various embodiments. A PRNG pool partitioning policy, used in an environment in which PRN requirements may belong to R usage contexts, while S distinct PRNGs are available in pool 130 and S differs from R, may indicate the manner in which the S PRNGs are to be mapped to the R usage contexts. Some of the R usage contexts may be assigned a single PRNG, while others may be assigned several PRNGs in one implementation.

In at least some embodiments, the PSE 180 may employ one or more transformation functions, such as selected cryptographic transformation functions 186, to obfuscate baseline PRNs produced by the PRNGs when fulfilling PRN requirements. In some cases the transformation function may be selected based on the usage context; in other scenarios one or more parameters of a transformation function may be selected based on the usage context. In some embodiments the PSE 180 may itself implement the transformation functions, while in other implementations the PSE may cause or request some other entity to apply the transformation functions. The transformation functions may be used instead of, or in addition to, partitioning of the PRNG pool 130 or the entropy source pool 120 in various embodiments. In some embodiments, the PSE may dynamically generate a new transformation key for each PRN requirement, and use the dynamically generated key to transform one or more baseline PRNs (e.g., using a selected hashing technique or a selected encryption algorithm) to produce the response PRN provided to the client. In some implementations, the key itself may be obtained by the PSE 180 from a selected PRNG 131—that is, entropy may be consumed not just to generate the baseline PRN to be used to fulfill the requirement, but also to generate the key to be used to transform the baseline PRN. In some embodiments in which multiple baseline PRNs are used to fulfill a requirement for a single PRN, the maximum rate at which a PSE can provide PRNs may be lower than in embodiments in which entropy is consumed more conservatively (e.g., by obtaining baseline values to be transformed to generate the response PRN using a mechanism that does not consume additional entropy for each new PRN requirement).

In order to avoid (or delay) situations in which the entropy sources become a bottleneck throttling the rate at which client PRN requirements can be met, in some embodiments alternative approaches which consume less entropy per requirement may be used. In one scenario, for example, a plurality of encryption or transformation keys may be pre-generated (e.g., either using respective PRNGs, or using a mechanism that does not consume additional entropy for each new key), and a particular key may be selected from the pre-generated keys for any given request. The PRN request's usage context may be used to select the particular key from the set of pre-generated keys in some embodiments.

Usage context determination and cryptographic transformations may be used independently of one another in some embodiments. In contrast, partitioning of the PRNG pool and/or the entropy source pool may at least in some embodiments be dependent on or combined with usage context determination. In at least some embodiments, the entropy source pool 120 and/or the PRNG pool 130 used by a given PSE may each comprise just a single member. That is, multiple PRNGs 131 and/or multiple entropy sources 121 may not be required. Instead, in such embodiments, the PSE may determine PRN usage contexts using one or more of the approaches indicated above, and segregate or isolate the PRNs provided to various clients 122 based on the usage contexts. Further details and examples are provided below regarding the manner in which various security enhancement mechanisms 182 may be used, either in isolation or in combination with one another, in various embodiments. In some embodiments, multiple PSEs 180 may be established in a given computing environment, and at least some of the PSEs may implement different security policies than others. In at least one embodiment, a given PSE 180 may implement respective security policies (e.g., involving the use of a particular combination of mechanisms 182) for different sets of PRN requirements, or at different times—that is, a given PSE need not necessarily fulfill PRN requirements using the same approach during the entire duration for which the PSE is operational. In one embodiment, clients 122 may be able to provide input to the PSEs indicating preferences regarding the security enhancement mechanisms. In some embodiments in which a PSE is implemented as part of a billable service, clients may be charged different amounts for respective combinations of security enhancement mechanisms utilized on their behalf. For example, a client for whom PRNG pool partitioning as well as cryptographic transformation functions are used may be charged more per billable PRN unit (e.g., per 1000000 PRNs) than another client for whom only one of the two techniques is used. In at least one embodiment, some clients may be permitted to opt out of the security enhancements implemented by the PSEs 180, and may be charged a different rate than clients that opt in for the enhancements.

Accumulation-Based Attacks on Vulnerable PRNGs

FIG. 2 illustrates an example of a scenario in which a malicious client of a random number generator may be able to predict statistical characteristics or properties of one or more random numbers produced for other clients, according to at least some embodiments. In the depicted embodiment, a single PRN generator 231 is used to provide PRNs in response to requests from multiple clients C1, C2 and C3, and PSEs of the kind illustrated in FIG. 1 are not being used to improve upon the native security characteristics of the PRNs. The PRN generator 231 may be deemed "vulnerable" in the depicted scenario because, for example, the algorithm used to obtain the random bit sequence from the entropy source being used may be flawed, or the entropy source itself may not capture physical phenomena which meet desired statistical levels of randomness.

In the scenario shown, one of the clients (C3) may wish to penetrate the security of the applications for which other clients C1 and C2 are using PRNs produced by PRNG 231. The malicious client C3 may therefore accumulate a number of PRNs C3.PRN1, C3.PRN2, C3.PRN3, etc., over some period of time, by invoking the appropriate programmatic interfaces provided by PRNG 231. The accumulated PRN collection 223 may be used as input for one or more reverse engineering algorithms 250 implemented in client C3's computing environment 240. Given the potentially poor quality of the entropy or algorithm being used by PRNG 231, the reverse engineering algorithms 250 may be able to predict, at least with some non-zero degree of accuracy desired by malicious client C3, statistical properties or predicates of portions or all of the PRNs 222A (generated for client C1) and/or PRNs 222B (generated for client C2), as indicated in block 260. For example, it may be possible for client C3 to use accumulated PRNs to predict, with greater than X percent accuracy, the relative count of "1"s and "0"s in a binary representation of a given PRN 222A or a given PRN 222B. In some extreme cases, it may even be possible to predict portions or all of individual PRNs 222A or 222B, e.g., instead of or in addition to statistical properties thereof. Properties of PRNs that have already been produced, and/or PRNs that are produced in the future, may be predictable by reverse engineering algorithms 250 in some cases. Using the predicted properties, the malicious client C3 may be able to attack the applications reliant on C1's or C2's PRNs in the example scenario shown in FIG. 2. In contrast, if some or all of the output segregation security enhancement techniques discussed with respect to FIG. 1 were applied, it would be much more difficult for client C3 to successfully attack the other clients. For example, if entirely different entropy sources or PRNGs were used for each client, the accumulated PRNs of C3's collection 223 would have no bearing on, and therefore no predictive benefit with respect to, the PRNs 222A or 222B. Similarly, if sufficiently strong transformation functions were used to produce PRNs 222A, 222B and/or PRNs of collection 223 as well, it may become computationally intractable for client C3 to undo the transformations to make any useful predictions regarding the other clients' PRNs. Attacks similar to those shown in FIG. 2 with respect to baseline PRNs (such as C1. PRN1, C1.PRN2 etc.) provided directly to clients from PRNGs may also be attempted in scenarios in which artifacts dependent on or derived from the baseline PRNs are provided to the clients by an application or protocol implementation stack. The use of the security enhancement techniques described herein may also render such attacks largely ineffective in various embodiments.

Random Data Service Implementing PRN Security Enhancements

In some embodiments, PRNs may be generated or used in computing environments in which resources are often shared by multiple clients. Such shared use of resources, such as a single hardware host used for many different clients' applications, may in theory increase the opportunities for malicious entities to attempt attacks of the kind illustrated in FIG. 2. As a result, implementing security enhancements for PRNs may be especially important in such shared-resource or multi-tenant embodiments.

Figure 3:
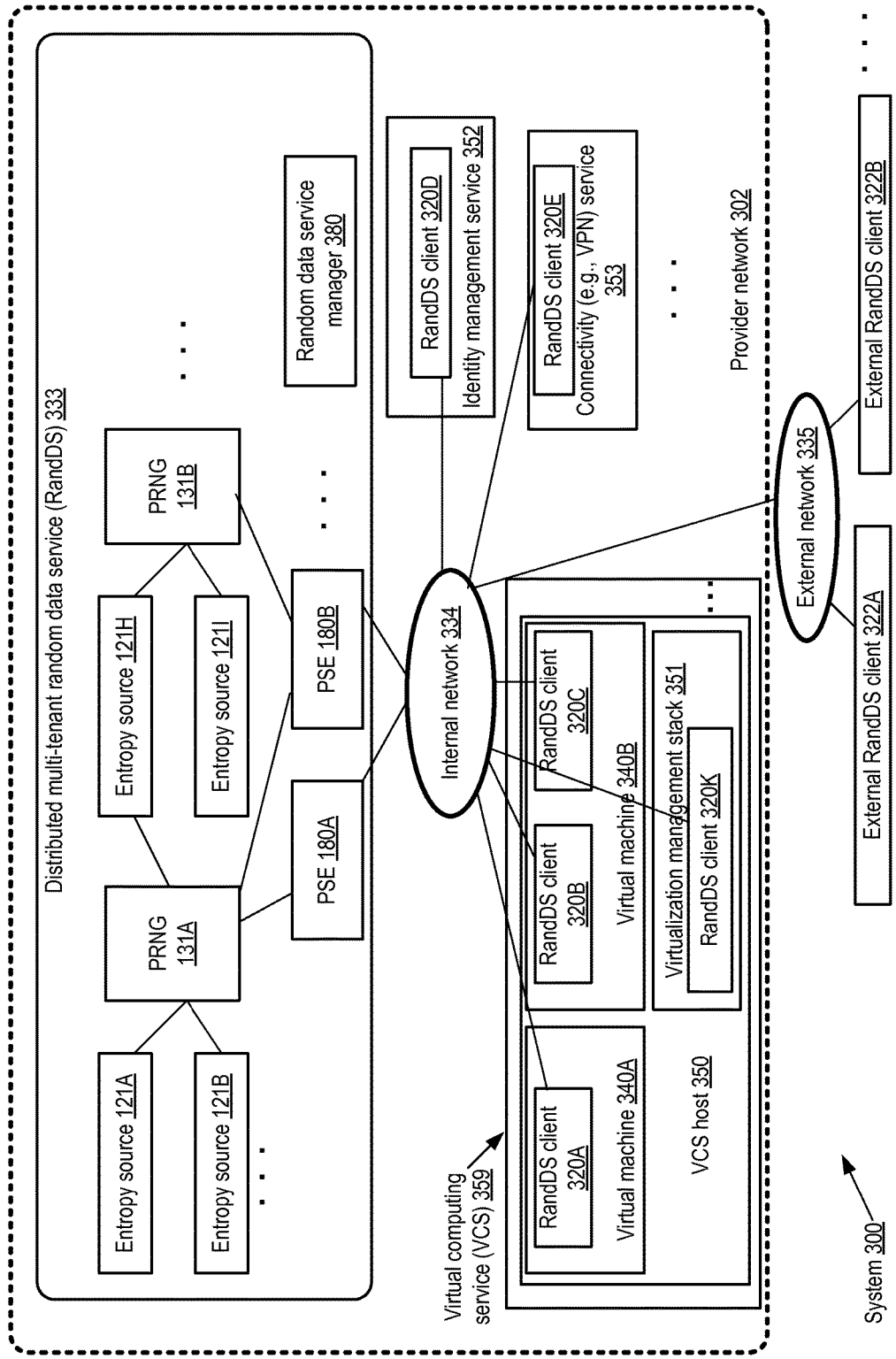
FIG. 3 illustrates an example provider network environment in which a random data service may be implemented, according to at least some embodiments.

FIG. 3 illustrates an example provider network environment in which a random data service (RandDS) 333 may be implemented, according to at least some embodiments. In system 300 of FIG. 3, the RandDS 333 of provider network 302 may include a variety of physical and logical resources distributed across one or more data centers. Random data service manager 380 may comprise a collection of resources responsible for managing and implementing the generation and delivery of random data artifacts, including PRNs as well as higher-level artifacts such as globally unique identifiers constructed using PRNs, to a variety of random data consumers. Such consumers may include, for example RandDS clients 320 (e.g., 320A, 320B, 320C, 320D, 320E and 320K) within the provider network 302, as well as external RandDS clients 322 (e.g., 322A and 322B) outside the provider network. As shown, the RandDS 333 may include a plurality of PRNGs such as PRNG 131A and PRNG 131B. Each of the PRNGs 131 may utilize digitized representations of random phenomena that occur at a respective set of one or more entropy sources 121 to generate random data. For example, PRNG 131A utilizes entropy sources 121A, 121B and 121H in the depicted embodiment, while PRNG 131B utilizes entropy sources 121H and 121I.

A number of different types of phenomena may be used as entropy sources in various implementations. Some entropy sources 121 may represent naturally-occurring, largely unpredictable events or phenomena, such as changes in weather or atmospheric conditions such as wind speeds, radioactive decay, radio noise, or various types of quantum-mechanical effects. Other entropy sources may represent phenomena that occur within engineered articles or devices, but are not easy to predict or control, such as shot noise, electrical noise, or thermal noise within various electronic devices, clock drift, movements of disk drive read/write heads, patterns of keyboard entries, and the like. At least in some cases, the phenomena or events at an entropy source 121 may need to be transformed from the analog domain to a digital domain to obtain the bit-sequences used as PRNs. A digitizer used for such a transformation may include, for example, a transducer capable of detecting the analog phenomena or events, an amplifier to enhance the detected signals, an analog-to-digital converter, and/or a sampler configured to extract samples of the output of the analog-to-digital converter. In some embodiments, some devices usable as entropy sources may produce bit-sequences without the help of an intermediary such as a digitizer—e.g., some entropy sources 121 may produce digital rather than analog output. In at least some embodiments, it may be possible to change the set of entropy sources used for a given PRNG over time; in other embodiments, PRNGs and entropy sources may be tightly coupled, and such changes may not be possible.

In one embodiment, the random data service manager 380 may be responsible for implementing a variety of security enhancement policies for PRNs and/or artifacts derived from PRNs. The service manager 380 may establish some number of PSEs 180, such as PSE 180A and 180B to implement the security policies using various combinations of one or more security enhancement mechanisms on the baseline or raw PRNs obtainable from the PRNGs 131. A given PSE 180 may be designated for one or more PRNGs in some embodiments—e.g., PSE 180A has access to baseline PRNs produced by PRNG 131A, while PSE 180B has access to baseline PRNs produced by PRNG 131A as well as baseline PRNs produced by PRNG 131B. In at least one embodiment, the RandDS 333 may include a set of hardware security devices dedicated for generating high-quality random numbers for security-related functions, and one or more PSEs 180 may be incorporated within, or associated with, such special purpose hardware security devices. In at least some embodiments, different PSEs may implement different security policies concurrently—e.g., PSE 180A may use usage context-based PRNG pool partitioning, while PSE 180B may use secure transformation functions without determining usage contexts. Furthermore, in various embodiments, a given PSE's security policy may be modified programmatically by the random data service manager 380—e.g., from some time T1 to T2, one security policy may be used at PSE 180A, and from time T2 to T3, a different security policy may be used at PSE 180A.

At least some of the PSEs 180 may receive requests for PRNs (and/or for data artifacts to be constructed using PRNs) over some combination of internal network 334 and external network 335 in the depicted embodiment. The requests may be received via any of a number of programmatic interfaces supported by RandDS 333, including for example web-services interfaces. In addition to the RandDS 333, a number of other network-accessible services may be implemented in provider network 302 in the depicted embodiment, and entities within such services may interact with the PSEs 180 to obtain PRNs or PRN-derived artifacts. For example, a multi-tenant virtual computing service 359 may be implemented in provider network 302. The VCS 359 may comprise numerous VCS hosts 350, each of which is a hardware server at which one or more virtual machines such as 340A and 340B may be instantiated on behalf of various VCS customers. Some PRN requests or requirements may originate from applications running at such virtual machines 340, such as RandDS client applications 320A (at virtual machine 340A) and RandDS client applications 320B and 320C (at virtual machine 340B). In addition to the virtual machines 340 allocated to VCS customers, each VCS host 350 may include a virtualization management software stack 351, e.g., comprising a hypervisor and/or an administrative operating system instance set up in a privileged or administrative-domain virtual machine. The virtualization management software stack 351 may serve as an intermediary between the hardware devices of the VCS host 350 and the virtual machines 340—e.g., lower-level networking functions may be handled by at the virtualization management stack. At least some of the virtualization management stack functionality may require the use of PRNs in various embodiments. Thus, the virtualization management stack 350 may represent another example of a RandDS client 320K which communicates with the PSEs 180 via internal network 334. An identity management service 352 of the provider network, responsible for handling authorization, authentication, roles and capabilities of various entities, may also interact with PSEs 180 (e.g., via a RandDS client 320D) to obtain PRNs for its operations. A number of networking or connectivity-related services 353, such as a VPN (Virtual Private Network) service, may also require PRNs to implement its protocols. RandDS client 350E within the connectivity service 353 may interact with PSEs 180 to obtain the necessary PRNs for the service. External applications, e.g., running at client-owned premises outside the provider network 302, may also include respective RandDS clients such as 322A and 322B in the depicted embodiment, which transmit PRN requests to the PSEs via a combination of external network 335 and internal network 334. In some cases, components of services other than RandDS may act as PSEs as well—e.g., components of the identity management service 352, the VCS 359, or a connectivity service 353 may identify PRN requirements to perform their operations, and apply one or more of the techniques on baseline PRNs to fulfill the requirements.

In response to receiving a request for a PRN, a PSE 180 may provide a response PRN derived from the raw or baseline bit sequences produced by the PRNGs 131 affiliated with the PSE. In some embodiments, the PRN usage context corresponding to the request may be determined based on various factors such as its origin (e.g., the virtual machine or client process at which the request was generated), its apparent intended accessibility level (e.g., whether the PRN is going to be used for a secret accessible only within a primary security boundary, or whether it is potentially readable by many different processes or entities), and so on. The usage context may then be used to select a particular PRNG 131 in some implementations, and/or to select a parameter such as a key to be used in a secure transformation of the baseline PRN. The output obtained from such a usage context-influenced transformation function, or the output from a particular PRNG selected on the basis of the usage context, may then be used to respond to the RandDS client. In some embodiments, the PSE need not necessarily determine a usage context to prepare its response PRN—instead, for example, a cryptographic transformation function using a context-independent key may be applied to a baseline PRN obtained from a PRNG as mentioned earlier.

PRN Usage Context Examples

Figure 4:
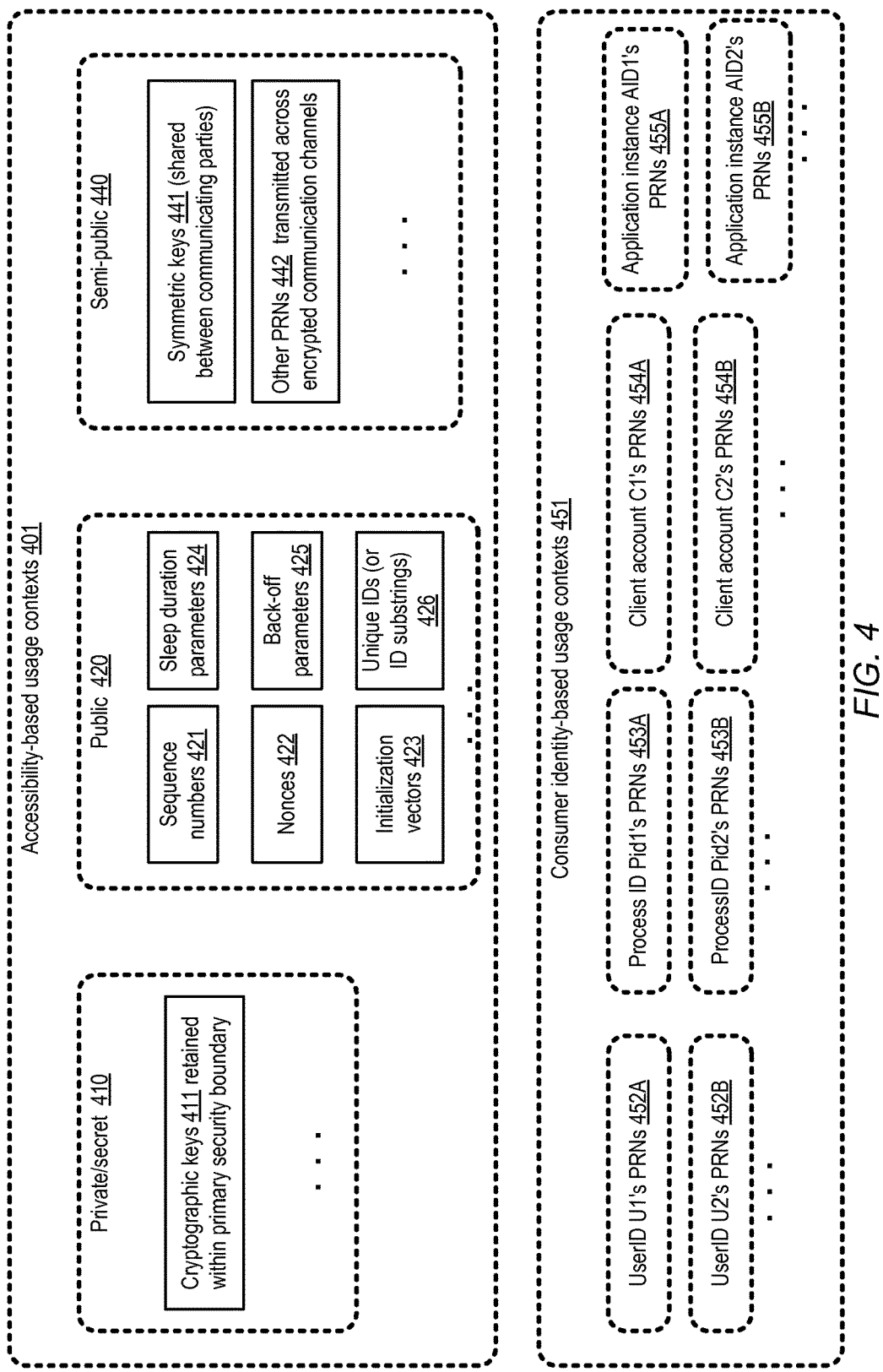
FIG. 4 illustrates examples of factors that may be used to distinguish the usage contexts of random numbers, according to at least some embodiments.

FIG. 4 illustrates examples of factors that may be used to distinguish the usage contexts of random numbers, according to at least some embodiments. The usage contexts may be used to implement one or more other steps of a security enhancement procedure as discussed earlier. One or both of two broad usage context classification techniques may be used in the embodiment depicted in FIG. 4—accessibility-based classification, or requester identity-based classification.

Accessibility-based usage contexts 401 may include, for example, a secret/private category 410, a public category 420, and a semi-public category 440 in various embodiments. PRNs that are to be used for encryption keys or other randomization-based artifacts that are not intended to be shared between multiple entities, and typically are not expected to cross a primary security boundary associated with the PSE or the consumer of the PRN, may be placed in secret/private category 410. In contrast, requirements for PRNs that are to be used for artifacts such as sequence numbers 421, cryptographic nonce values 422, initialization vectors 423 for block cipher techniques, sleep duration parameters 424, back-off-related parameters 426 which may be employed in various protocols, and/or unique identifiers 426 (or portions of strings used for unique identifiers), any of which may be shared among multiple entities outside security boundaries, may be classified as public requests in the depicted embodiment. In at least some use cases, artifacts corresponding to the public category 420 may be accessible in plain text by multiple entities. Semi-public PRN requirements 440 may include, for example, symmetric keys 441 that are shared, e.g., using encrypted communication mechanisms, between two or more communicating parties (each of which may enforce their own security boundaries outside which the keys are not to be exposed), or other PRNs 442 that are transmitted across encrypted communication channels. In some embodiments, the particular programmatic interface (e.g., API) submitted by a client to request a PRN may provide an indication of the intended accessibility level of the response. In other embodiments, the API calls immediately preceding or following a particular PRN request may be used to infer the accessibility level. In embodiments in which applications identify PRN requirements without receiving requests per se, the applications may be able to determine the accessibility level based on the type of artifact being generated.

With respect to consumer identity-based usage contexts 451, various kinds of metadata associated with a given PRN request or requirement may be used for classification purposes in different embodiments. For example, in one embodiment, each PRN request may explicitly or implicitly indicate a user identifier, and such identifiers may be used as usage context indicators, as in the case of PRN sets 452A and 452B for user identifiers U1 and U2. Similarly, the process identifier (PID) of a PRN consumer may be used in some embodiments, as in the case of categories 453A and 453B for PID1 and PID2 respectively. PRN requirements may be categorized based on client accounts (as in the case of categories 454A and 454B for client accounts C1 and C2 respectively), and/or on the basis of application instance identifiers for which the PRNs are to be used, as in the case of categories 455A and 455B for applications with identifiers AID1 and AID2 respectively. A combination of accessibility-level-based and requester-identity based usage context characterization may be used in at least some embodiments—e.g., public requests from a client account C1 may be placed in a different usage context category than public requests from a different client account C2.

A number of specific examples of alternative approaches involving various combinations of usage context determination, PRN source pool partitioning, and secure transformations of raw PRNs which may be used in various embodiments are illustrated in FIG. 5-FIG. 8. It is noted that while in various embodiments, a given PSE may implement one or more of the approaches shown in this set of figures, the PSE may not be restricted to these approaches alone. Furthermore, within a given embodiment in which multiple PSEs are instantiated, different PSEs may use respective distinct combinations of some subset or all of these approaches, or variants thereof.

Using Multiple PRNs to Prepare a Single Response PRN

Figure 5:
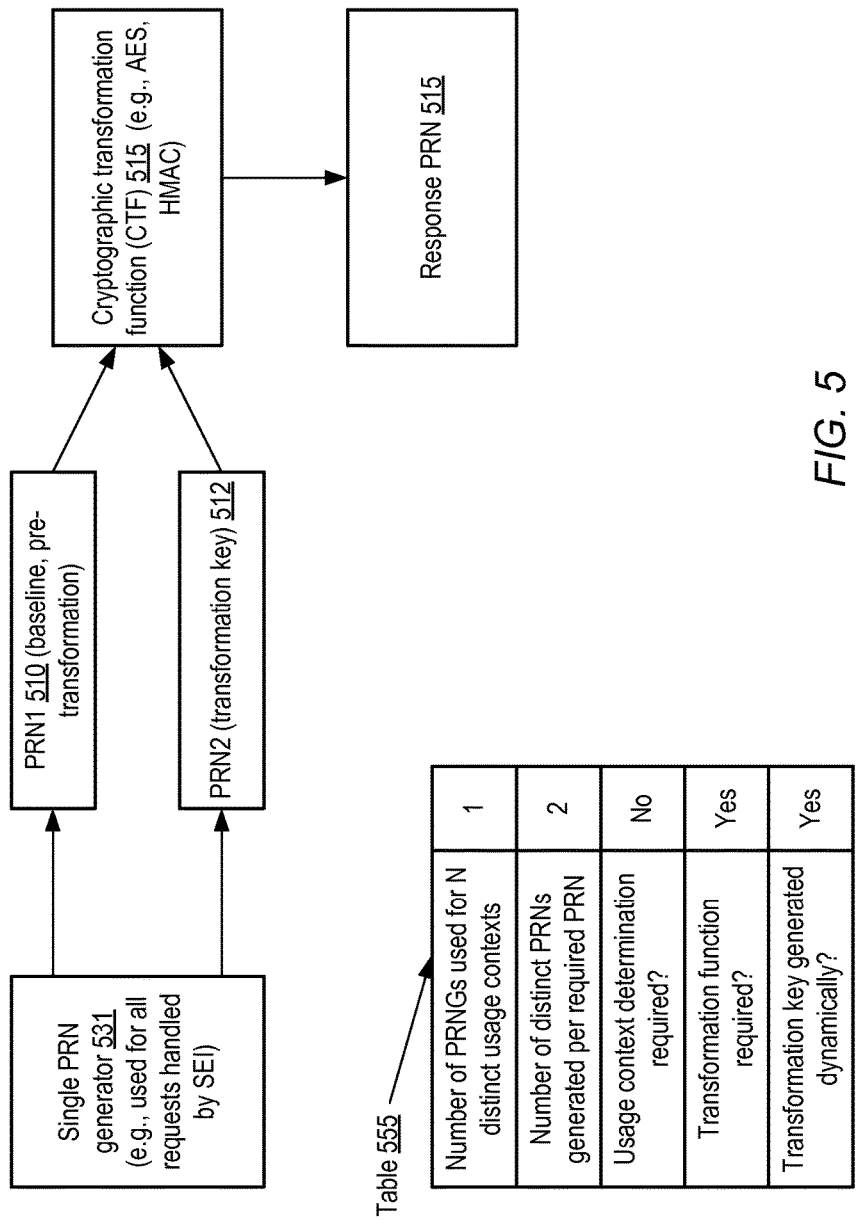
FIG. 5 illustrates an example of a security enhancement technique involving the use of multiple dynamically-generated pseudo-random numbers (PRNs) to fulfill a requirement for a single PRN, according to at least some embodiments.

FIG. 5 illustrates an example of a security enhancement technique involving the use of multiple dynamically-generated pseudo-random numbers (PRNs) corresponding to a requirement for a single PRN, according to at least some embodiments. In the depicted embodiment, a single PRNG 531 may be employed for handling all the PRN requirements processed by a PSE 180. When the PSE identifies a requirement for a PRN, two distinct PRNs may be obtained from the PRNG 531: PRN1 510, which represents a baseline bit sequence, and PRN2 512, which is used to transform PRN1 510 via cryptographic transformation function (CTF) 515. In some embodiments the PSE may itself implement the transformation function, while in other embodiments the PSE may cause the CTF to be applied to the baseline PRN by some other entity. Some CTFs may encrypt baseline PRNs, while others may implement transformations such as the generation of hash values which may not involve encryption. Combinations of CTFs (e.g., some implementing encryption, and others which do not rely on encryption) may be used in some implementations. Any of a number of different CTFs may be used in various embodiments, including for example a function that implements AES (the advanced encryption standard) or an HMAC (hash message authentication code) function. In at least some implementations, both PRNs may be provided as input parameters to the CTF 515, and the output of the CTF may be used as the "response" PRN. As indicated earlier, the term "response PRN" may be used in this document to indicate the PRN that is used to fulfill a PRN requirement identified by a PSE, as distinct from one or more "raw" or "baseline" PRNs that may be generated, using respective portions of entropy, by one or more PRNGs for the request. In some cases, as in the scenario illustrated in FIG. 5, the response PRN may differ from a baseline PRN generated at a source PRNG for the request; however, in other cases, as when usage context-based source pool partitioning is employed, the response PRN may not require modifications to a baseline PRN.

Table 555 lists several properties of the particular security enhancement technique illustrated in FIG. 5. Similar tables are provided in each of FIG. 6, FIG. 7 and FIG. 8 to provide an easy way to compare the techniques illustrated in these figures. As shown in the first (topmost) row of table 555, only a single PRNG may be needed to respond to requests with N different usage contexts in the technique of FIG. 5. It is noted that if multiple PRNGs are available, the PSE may use any one of the PRNGs, or even a pair of PRNGs (one for each PRN), to implement the transformation-based security enhancement approach shown in FIG. 5 in some embodiments. The first row of table 555 is intended to clarify that no more than one PRNG is required for the illustrated technique, but this does not prevent a PSE from using as many PRNGs as desired in various embodiments.

At least two separate PRNs may be generated per required PRN, as indicated in the second row of table 555, with respective consumption of entropy, which may result in the entropy sources becoming a bottleneck for the PSE. The third row indicates that usage context determination is not required for the two-PRN technique (although the PSE may nevertheless determine usage contexts in some implementations, e.g., for other purposes such as tracking/auditing). As indicated in the fourth row of table 555, a transformation function is required for the technique, and a key used for the transformation is generated dynamically as indicated in the fifth (bottom) row of table 555.

Transforming Deterministically-Obtained Values Using PRNs as Keys

Figure 6:
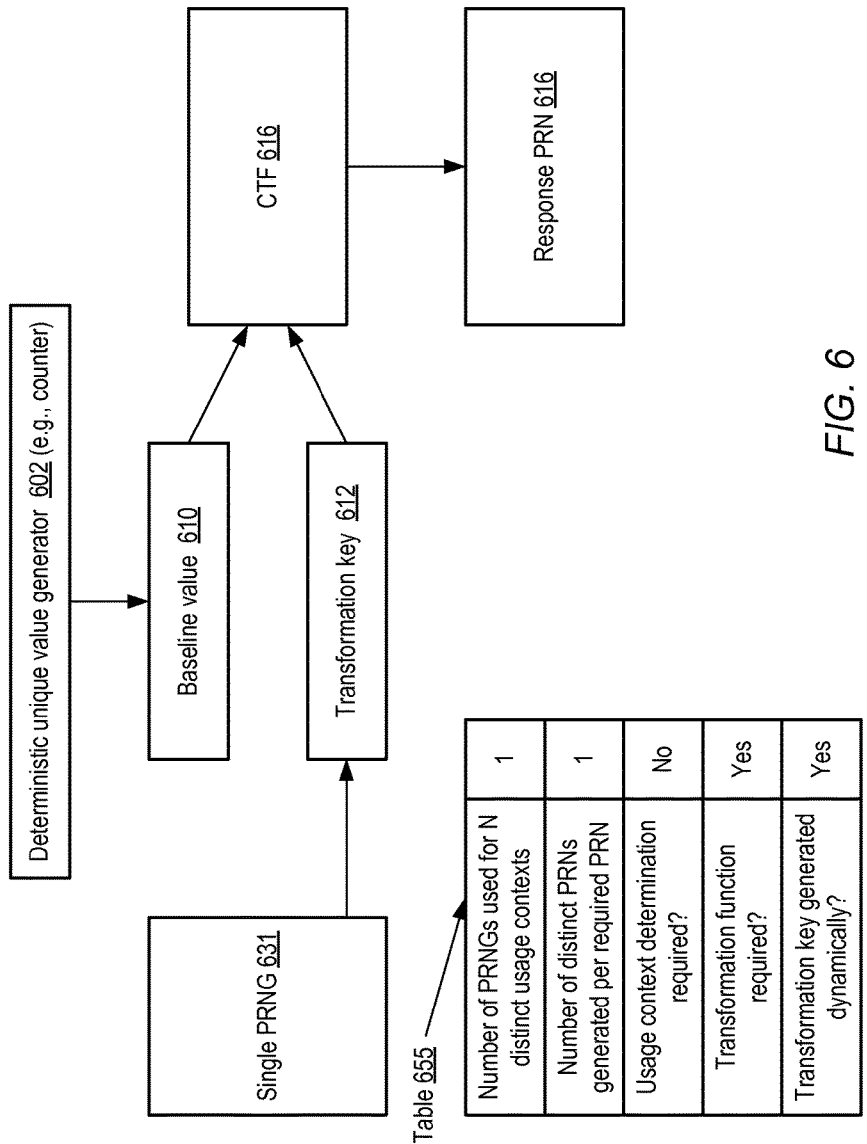
FIG. 6 illustrates an example of a security enhancement technique in which a PRN is used as an encryption key for a deterministically-obtained baseline value to fulfill a PRN requirement, according to at least some embodiments.

FIG. 6 illustrates an example of a security enhancement technique in which a PRN is used as a transformation key for a deterministically-obtained baseline value to fulfill a PRN requirement, according to at least some embodiments. The approach illustrated in FIG. 6 represents a variation on the approach used in FIG. 5, with the primary difference being that even though a new key requiring entropy consumption is generated dynamically for each PRN required as in FIG.

5, the value that is to be transformed is generated without using a PRNG and therefore does not use up additional entropy. Instead, a deterministic unique value generator 602, such as a counter, may be use to obtain a baseline value 610 for each successive PRN requirement handled by the PSE. In at least one implementation, the counter may be initialized or seeded using a PRN, but subsequent to the initialization, no additional entropy usage may be needed to generate the baseline values 610. The key 612 obtained from the single PRNG 631 may be passed as an input parameter to a CTF 616, together with the baseline value 610, as in FIG. 5, and the output of the CTF may be used as the response PRN 616.

Table 655 characterizes the technique of FIG. 6 using the same factors that were used in Table 555 of FIG. 5. Tables 555 and 655 differ in that the number of distinct PRNs used, which was 2 in Table 555, is 1 in Table 655. Of course, the amount of computation involved in determining the baseline value may differ as well—e.g., depending on the implementation, fewer CPU cycles may be needed to obtain the baseline value using a deterministic unique value generator than if the baseline value is obtained using a PRN. In embodiments in which fixed-length transformation keys (e.g., 64-bit or 128-bit keys) are used, the approach illustrated in FIG. 6 may have the advantage that a constant amount of entropy may be used to fulfill any given PRN requirement, regardless of the size of the response PRN required. In a somewhat less-efficient variation of the approach which may be employed in some embodiments, the baseline value may be obtained from a PRN, and the key may be obtained from a deterministic unique value generator. In such cases, the amount of entropy consumed per PRN required may vary with the size of the response PRN.

Pre-Generated Transformation Keys

Figure 7:
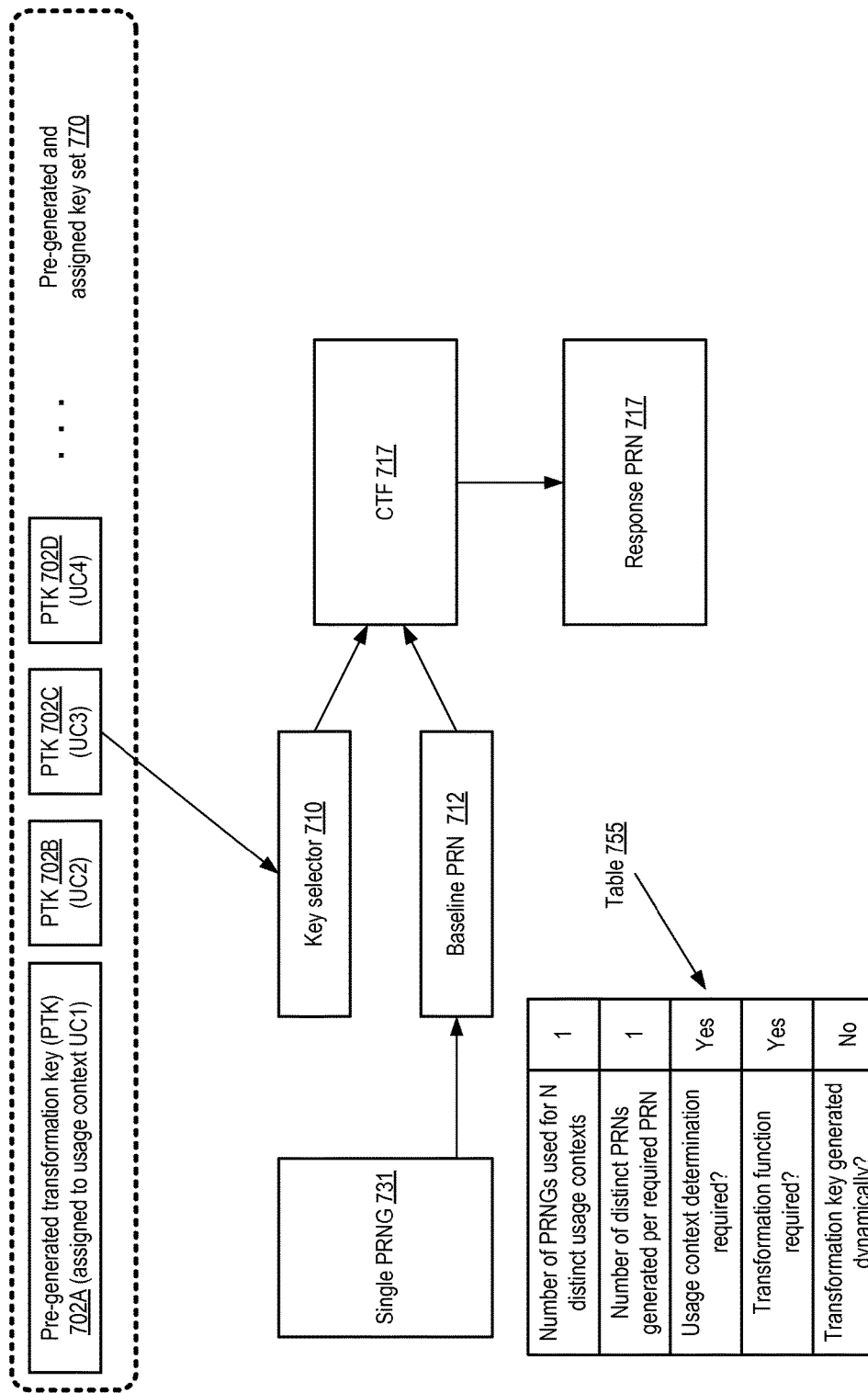
FIG. 7 illustrates an example of a security enhancement technique involving the use of a selected pre-generated transformation key to fulfill a PRN requirement, according to at least some embodiments.

FIG. 7 illustrates an example of a security enhancement technique involving the use of a selected pre-generated transformation key to fulfill a PRN requirement associated with a given usage context, according to at least some embodiments. In this technique, the usage context of a PRN requirement is used by a key selector component 710 of the PSE to identify which particular pre-generated transformation key (PTK) 702 (from among PTKs 702A, 702B, 702C, 702D etc. of key set 770) should be used for transforming a baseline PRN 712 obtained from a PRNG 731. For example, PTK 702A may be used for usage context UC1, PTK 702B may be used for usage context UC2, etc. The selected PTK is passed as a parameter to a CTF 717, together with baseline PRN 712, and the output of the CTF is used as the response PRN.

In some implementations, the number of distinct usage contexts to which all the PRN requirements identified by a PSE will be mapped may be fairly small and may be known in advance, and the PSE may simply generate and assign the required number of distinct keys before any of the keys are used, e.g., during PSE initialization. In other embodiments, the number of distinct usage contexts identified may grow over time, and new keys may have to be generated whenever a new usage context is encountered. In at least one embodiment, the PTKs may be derived from respective PRNs—that is, some amount of entropy may be consumed initially for each PTK, but that entropy usage may be amortized over all the different PRNs mapped to the same usage context. In one implementation, a new PTK may be generated using a PRN when a usage context is first encountered, and may be cached thereafter for other PRNs associated with that usage context. In other embodiments, not all the PTKs may require the consumption of entropy—e.g., a first PTK of the set 770 may be generated using a PRN, but the other PTKs may be obtained deterministically from that first PTK (e.g., by incrementing) without using up any additional entropy. In some embodiments, pre-generated or cached keys may be used to transform baseline values obtained from a deterministic unique value generator such as a counter—e.g., with a random starting counter value for each usage context.

As shown in table 755, a single PRN may suffice to implement the technique of FIG. 7, and only one PRN may be generated internally per required PRN. Usage context determination as well as transformation functions may be used, but the keys used for the transformations need not be generated dynamically.

PRN Source Pool Partitioning

Figure 8:
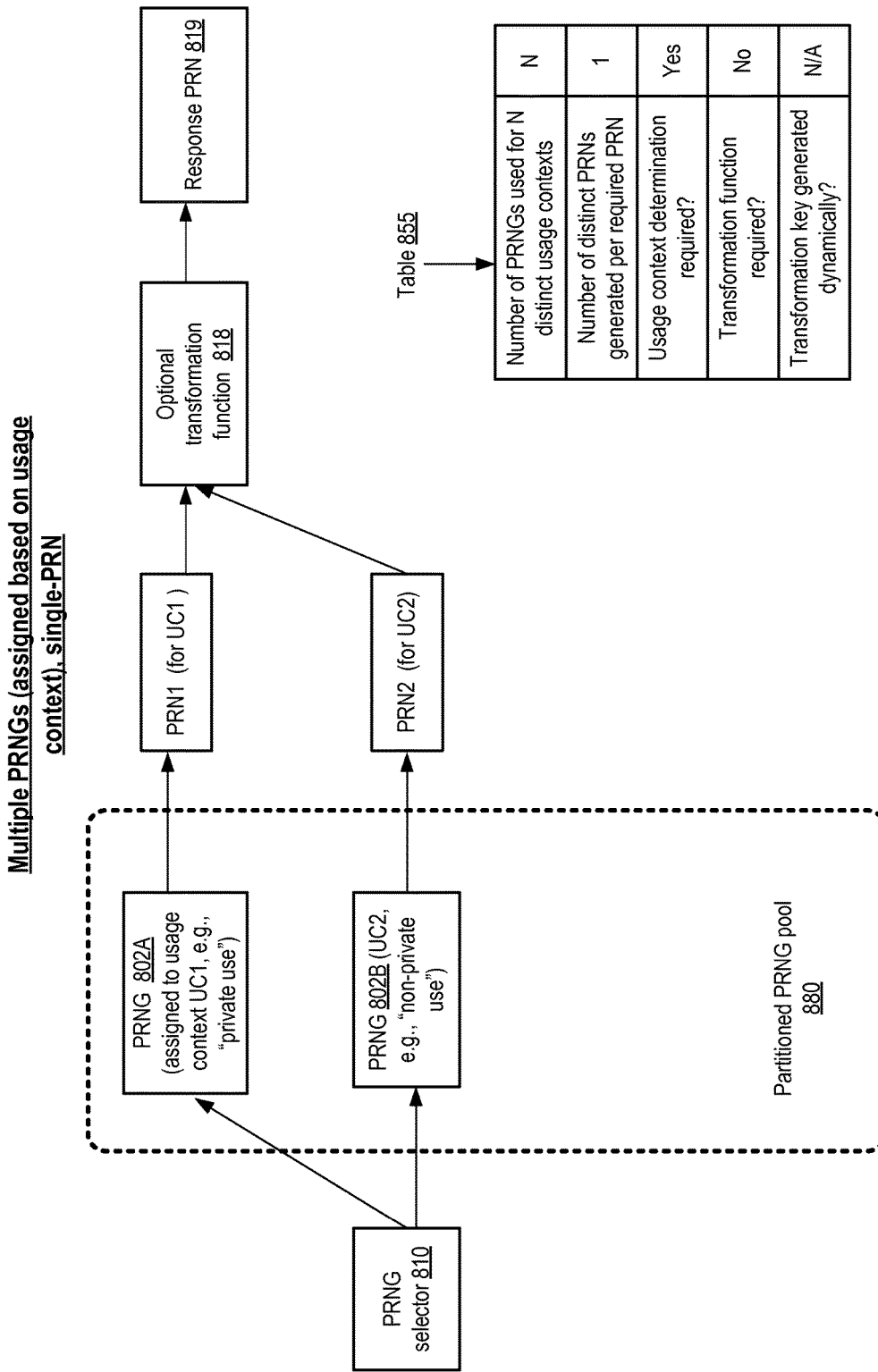
FIG. 8 illustrates an example of a security enhancement technique involving the selection of PRN generators based on PRN usage contexts, according to at least some embodiments.

FIG. 8 illustrates an example of a security enhancement technique involving the selection of PRN generators based on PRN usage contexts, according to at least some embodiments. In this technique, a transformation function need not necessarily be applied to a baseline PRNG; instead, output segregation may be achieved by partitioning the PRNG pool such that each requirements corresponding to different usage contexts are satisfied using respective independent PRN sources. Thus, a PRNG selector 810 associated with or implemented as part of a PSE may assign individual PRNGs 802 to one or more usage contexts. In the depicted embodiment, the PRNG pool 880 comprises PRNG 802A assigned to a first usage context UC1, and PRNG 802B assigned to usage context UC2. For example, UC1 may correspond to the "private" use discussed with reference to FIG. 4, and UC2 may correspond to all other (non-"private") uses. When a PRN requirement is identified, its usage context is determined and a baseline PRN (e.g., PRN1 or PRN2) is obtained from the PRNG assigned to that category. A transformation function 818 similar to those discussed with respect to FIG. 5-FIG. 7 may also be applied optionally in some embodiments to a baseline PRN obtained from the selected PRNG, and the result of the transformation may be used as the response PRN 819. In other embodiments, the baseline PRN obtained as a result of PRNG pool partitioning may be used as the response PRN 819 without applying any transformation. Although only two-way partitioning of the PRNG pool is shown in FIG. 8, any desired number of partitions of the PRNG pool may be set up in various embodiments (assuming that a sufficient number of PRNGs is available).

As in the case of any partitioning scheme in which the total number of partitions required may not be known a priori, and may differ from the number of members of the resource pool to be partitioned, in some implementations more than one PRNG may be assigned to a given usage context, or more than one usage context may have to be assigned to a given PRNG. In the simple scenario illustrated in FIG. 8, a 1:1 mapping between usage contexts and PRNGs may be used; however, in general, a P:Q mapping may be employed where at least one of P and Q is greater than one. In at least some embodiments, if a plurality of distinct entropy sources are available, the entropy source pool may be partitioned based on usage contexts in addition to or instead of partitioning the PRNG pool.

Table 855 lists the characteristics of the pool partitioning technique of FIG. 8. Assuming that the 1:1 mapping between usage contexts and PRNGs is used, N different PRNGs would be required to fulfill requirements with N different usage contexts. One new baseline PRN would be generated per required PRN. While the technique requires usage context determination, transformation functions are not mandatory, and so the question of whether a transformation key is generated dynamically or not is not applicable. One advantage of the pool partitioning approach illustrated in FIG. 8, relative to the techniques shown in FIG. 5-FIG. 8, is that neither CPU cycles nor entropy would be expended for a transformation function. Of course, if the rate at which PRN requests of different usage contexts are processed varies substantially, this may lead to an uneven distribution of workload among the PRNGs of pool 880.

The example techniques illustrated in FIG. 5-FIG. 8 may represent different tradeoffs between the consumption of resources such as entropy sources and CPU cycles, and may at least in some implementations result in slightly different levels of security. For example, if baseline values are selected deterministically as in FIG. 6, and a malicious entity is able to deduce or discover the deterministic algorithm being used, it may be somewhat easier to penetrate the PRN delivery system than if the approach of FIG. 5 were being used. In at least some embodiments, variations and combinations of the example techniques illustrated in FIG. 5-FIG. 8 may be employed—for example, in one embodiment multiple transformation functions may be applied in a pipelined manner to a baseline PRN instead of just one transformation function. In one embodiment, entropy from multiple entropy sources may be combined at a given PRNG, e.g., with the particular entropy sources and/or the number of entropy sources used being determined based on the PRN usage context. The technique of using pre-generated transformation keys (FIG. 7) may be combined with the PRNG pool partitioning approach of FIG. 8 in another embodiment. In some embodiments, a library of transformation functions may be available, and different functions may be selected for different individual PRN requirements or for different usage contexts.

Example Subcomponents of a PSE

Figure 9:
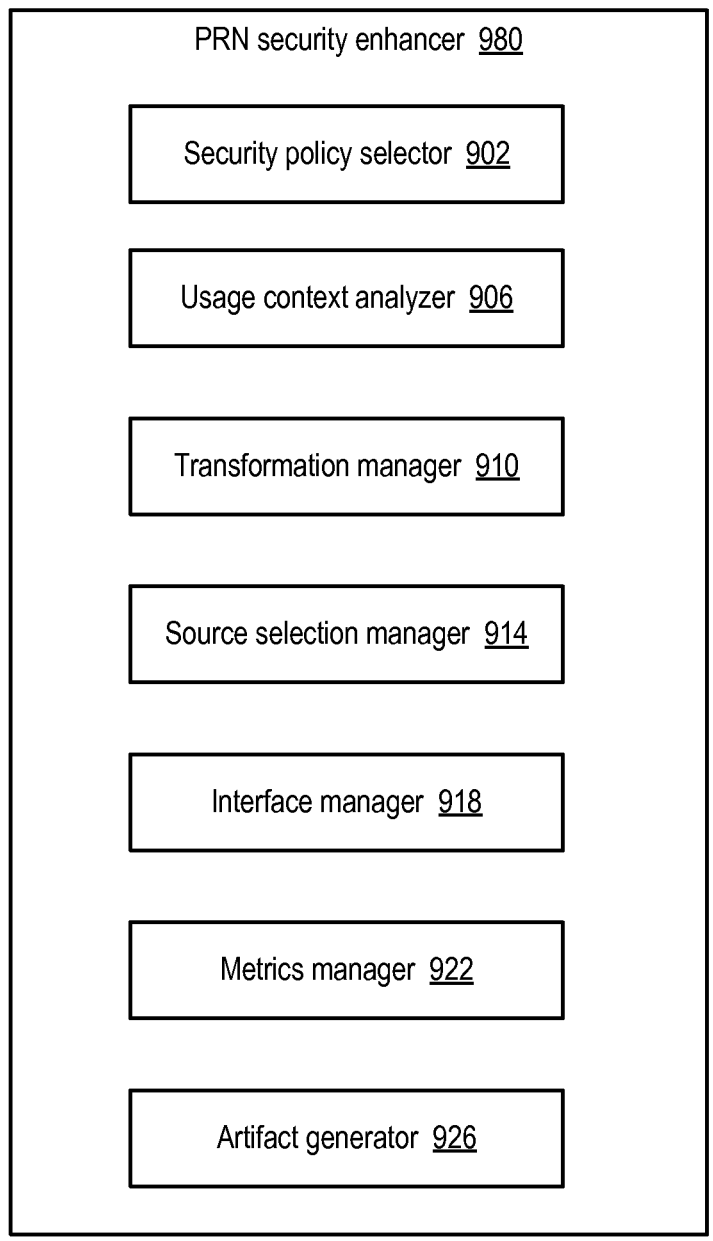
FIG. 9 illustrates example subcomponents of a random number security enhancer, according to at least some embodiments.

FIG. 9 illustrates example subcomponents of a PRN security enhancer 980 according to at least some embodiments. In the depicted embodiment, PSE 980 may be configurable to implement a plurality of different security policies—for example, some policies that are usage context-dependent, and others that do not require the determination of usage contexts. A security policy selector 902 may determine which particular policy or policies are to be applied to some set of PRN requirements in the depicted embodiment, e.g., based on some combination of factors such as input received from clients or administrators, entropy usage metrics, and so on. In embodiments in which a PSE is part of a random data service of the kind illustrated in FIG. 3, for example, a random data service manager 380 may select the policy to be enforced by a given PSE during a given time period, and the policy selector 902 may receive an indication of the selected policy from the random data service manager. In at least one embodiment, a given PSE may only be configured to implement a particular security policy, in which case a policy selector component may not be needed.

In various embodiments, a number of different approaches may be taken by usage context analyzer 906 with respect to identified PRN requirements. In some embodiments, the intended accessibility of the response PRNs may be predicted based on the particular APIs used for corresponding requests, and the accessibility level may be used as a usage context indicator. In other embodiments, a PRN request (or metadata maintained regarding a network connection over which a PRN request is received) may include specific parameters which can be used to determine the usage context, such as a source IP address, a client account, or even a request type. In at least some implementations, a flexible usage context determination framework may be implemented, in which for example the factors that are taken into account for identifying usage contexts can be changed over time. For example, if the number of distinct usage contexts being processed at PSE 902 grows beyond a threshold, in one implementation a less fine-grained context identification technique may be used for at least a subset of subsequent PRN requirements.

Transformation manager 910 may be responsible for implementing various aspects of secure transformations on baseline PRNs in the depicted embodiment. The transformation manager may select the particular function to be used (e.g., a function compliant with AES, an HMAC function, or some other hash-based difficult-to-invert transformation function), determine the transformation keys or encryption keys to be used if any keys are required, and/or execute the function. In at least one embodiment, a library of transformation functions with different invertibility characteristics (i.e., different levels of difficulty with respect to undoing a transformation to retrieve the baseline PRN or the transformation key) and/or different computational resource requirements may be accessible, and the transformation manager may choose which particular function is to be used for a given PRN or a given usage context. In some embodiments, no transformation may be applied for one or more usage contexts, while selected transformations may be applied to meet the respective security criteria associated with other usage contexts. In at least some embodiments, the transformation functions may be applied at modules or devices external to the PSE: e.g., the PSE may cause the transformations to be applied to the baseline PRNs by sending a request to some other component of the computing environment.

As indicated by the name, the source selection manager 914 may be responsible for identifying the particular PRNGs and/or entropy source(s) to be used for a PRNs of a given usage context. In a distributed environment in which the PRNGs and/or entropy sources may be reached via network connections, the source selection manager 914 may be responsible for keeping track of the availability or responsiveness of the PRNGs and/or entropy sources, and to switch between sources if necessary. The interface manager 918 may implement the programmatic interfaces used for both data-plane (e.g., client-PRN-request-related) and control-plane (e.g., administrative) interactions of the PSE. The control-plane interactions may for example include receiving client preferences or administrator overrides for various policies being implemented at the PSE.

In at least some embodiments, a metrics manager 922 may collect various types of measurements regarding the of PRNs provided by the PSE—e.g., the total number of PRNs corresponding to each usage context, the total number of usage contexts encountered, the CPU utilization associated with implementing the transformation functions, indirect measures of entropy usage (e.g., the number of bits of the PRNs used at the PSE), and so on. Such metrics may be useful in adjusting the policies and parameters being used at the PSE in some embodiments, and in some cases may also potentially help in the detection of security penetration attempts. In some embodiments, as mentioned earlier, a PSE may be responsible for generating derived artifacts using response PRNs. For example, a 256-bit GUID (globally unique identifier) of which 128 bits are randomly generated may be requested by a client. In such a scenario, an artifact generator 926 may construct the requested artifact from a response PRN, and verify that it meets the formatting or other requirements of the client, before transmitting it to the client. In at least one embodiment, several different PRNs may be obtained from respective PRN generators and combined into a higher-level object to be provided to a client. For example, in one embodiment in which a 256-bit PRN is requested by a client, the PSE may obtain a respective 64-bit PRN from each of four different PRNGs with independent entropy sources, and the artifact generator 926 may combine the four PRNs using some selected technique (e.g., concatenation or interleaving) to provide the client with the requested 256-bit PRN. In various embodiments, some of the PSE components shown in FIG. 9 may not be implemented, or other components not shown in FIG. 9 may be incorporated within at least some PSEs. In one simple implementation, for example, a PSE may simply be implemented as a wrapper around a random-number API supported by a standard such as POSIX, and components such as a policy selector, metrics manager or artifact generator may not be required.

Methods for Enhancing PRN Security

Figure 10:
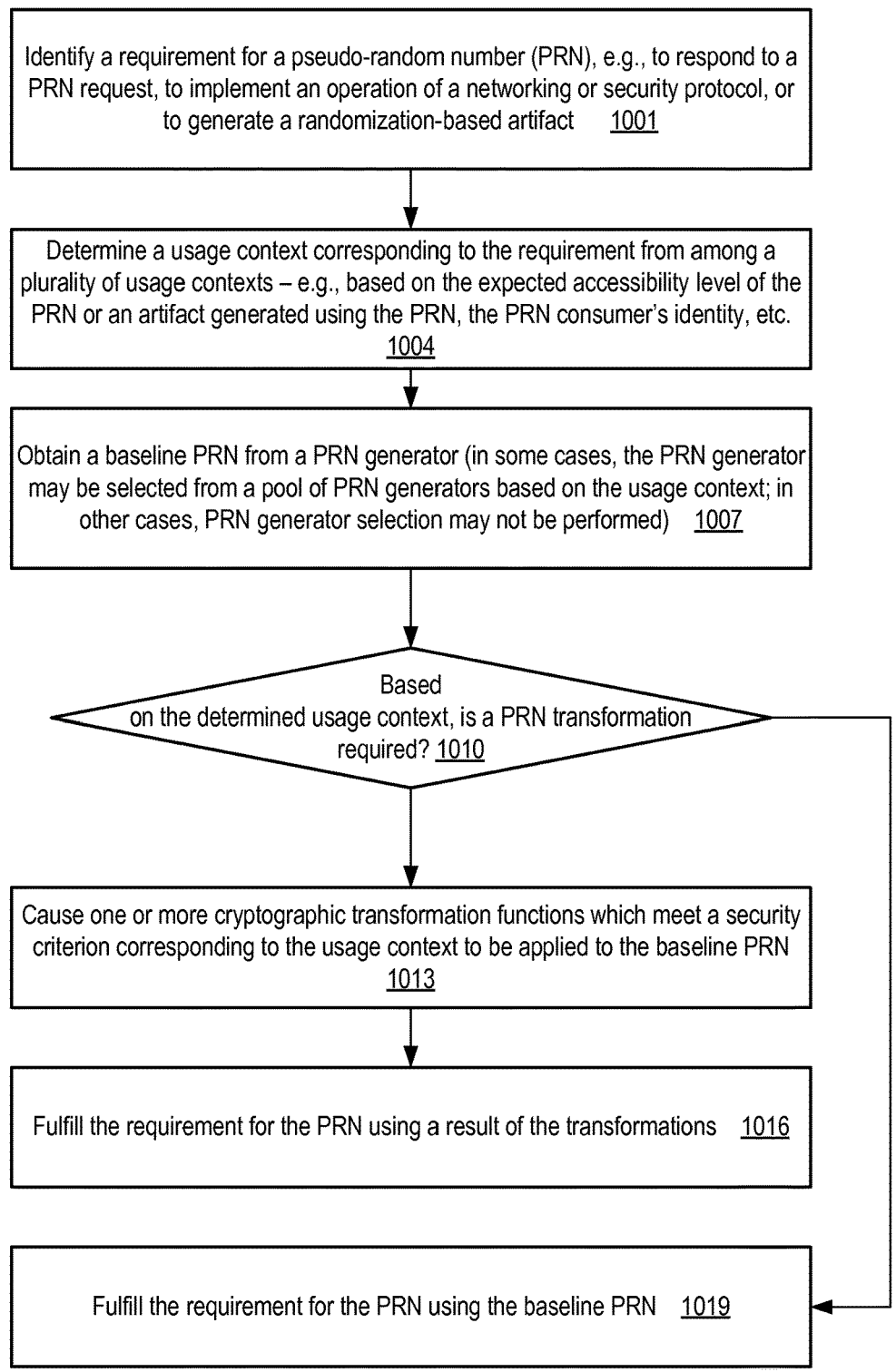
FIG. 10 is a flow diagram illustrating aspects of operations that may be performed to enhance random number security, according to at least some embodiments.

FIG. 10 is a flow diagram illustrating aspects of operations that may be performed to enhance random number security, according to at least some embodiments. As shown in element 1001, a requirement for a PRN may be identified at a PSE, e.g., as a result of receiving a client request, for implementing an operation of a security protocol or a networking protocol which does not involve an explicit request, and/or to generate an artifact which is to be constructed using a PRN.

A usage context corresponding to the requirement may be identified (element 1004), based on any of various factors such as an expected accessibility level of the response PRN to be provided or generated, an identity of a consumer of the PRN, a property of a request for the PRN, and so on. A baseline PRN may be obtained from a PRN generator (element 1007). In some embodiments in which multiple PRN generators are available, a particular PRN generator may be selected as the source of the baseline PRN based on the usage context. In other embodiments, usage context-based PRN generator selection may not be performed.

The PSE may determine, based at least in part on the usage context, whether one or more cryptographically secure transformation functions (CTF) are to be applied to the baseline PRN (element 1010). If such a transformation is not required, the baseline PRN may be used to fulfill the requirement (element 1019). Otherwise, the PSE may cause a CTF (which meets a security criterion associated with the usage context) to be applied to the baseline PRN (element 1013), and fulfill the requirement using a result of the CTF. In one embodiment, multiple types of CTFs may be usable, and a particular CTF may be selected based on the usage context. In some embodiments the PSE may implement the CTF(s), while in other embodiments the PSE may send a request to some other entity or module to apply the CTFs. In one embodiment, the PSE may generate or select a transformation key and/or a baseline value to be transformed via a CTF, and provide the key and/or the value to the CTF as input parameters. The key may be determined based at least in part on the usage context in some embodiments.

A number of variations on the basic operations illustrated in FIG. 10 may be implemented in different embodiments. For example, in one embodiment a CTF may be applied to a baseline PRN regardless of the usage context, or even without determining the usage context.

It is noted that in various embodiments, some of the operations shown in the flow diagram of FIG. 10 may be omitted or performed in a different order than that shown, or may be performed in parallel rather than serially.

Use Cases

The techniques described above, of enhancing the security (or equivalently, reducing the vulnerability) of random numbers provided for use in many different application contexts may be useful in a several different scenarios. For example, in environments such as provider networks where numerous consumers of random numbers share resources including network pathways and hosts, and at least some of the random numbers produced by a given source such as a particular PRN generator are transmitted in plain text, such unprotected random data may be accumulated and used to penetrate other applications by malicious clients unless output segregation techniques of the kind used herein are implemented. Several of the techniques outlined herein may be implemented with relatively little overhead with respect to the baseline PRN generation mechanisms, thus avoiding cost increases for the providers of the PRNs, and without requiring any attempts to improve the quality of the underlying entropy sources or PRN generators. In various scenarios, flexible security enhancing frameworks may be implemented, allowing administrators and/or users of the frameworks to customize the techniques being used, e.g., by responding to increased random number request rates by adapting the transformation functions being used.

Illustrative Computer System

Figure 11:
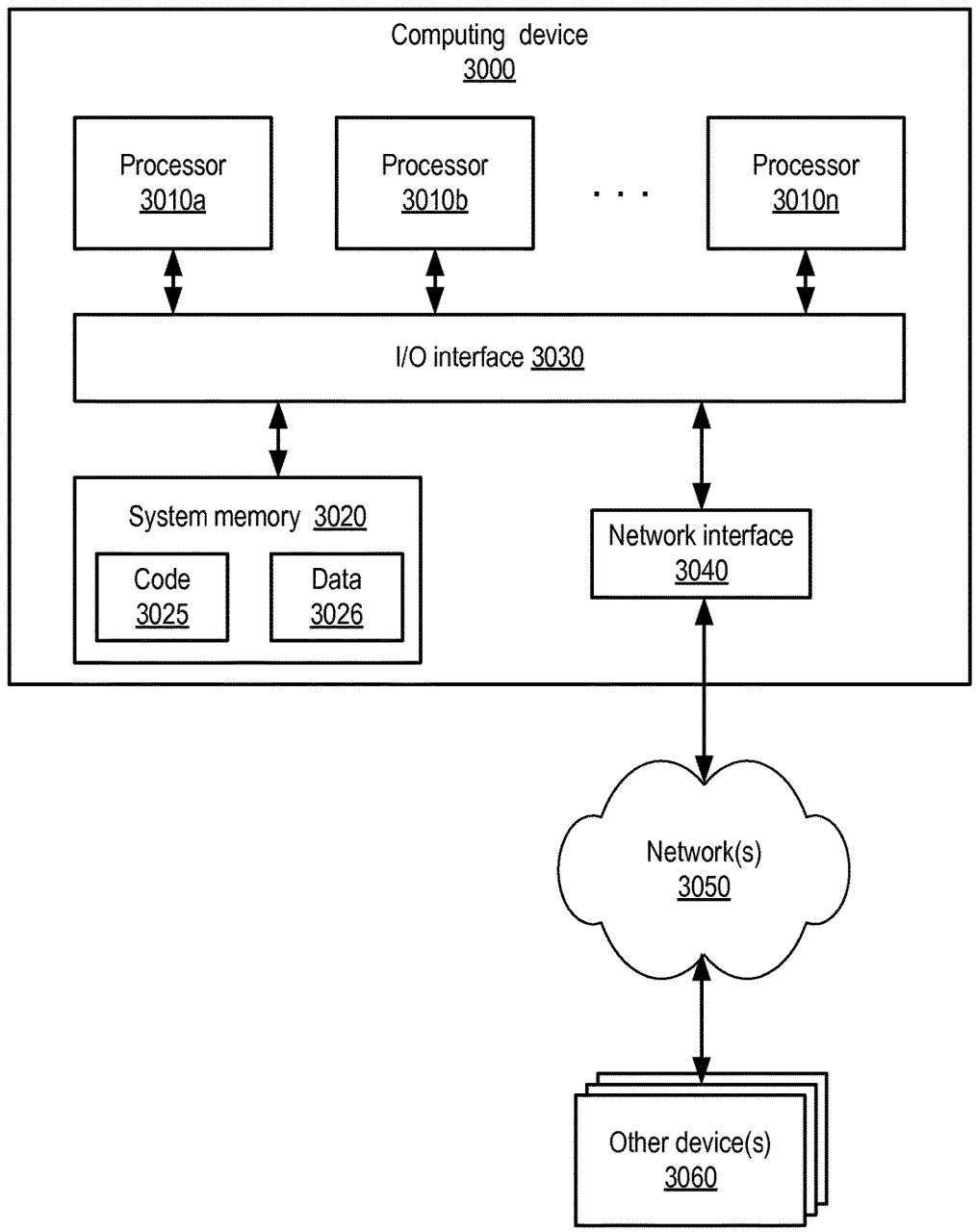
FIG. 11 is a block diagram illustrating an example computing device that may be used in at least some embodiments.

In at least some embodiments, a server that implements a portion or all of one or more of the technologies described herein, including the techniques to implement the PRN security enhancers, the PRNGs, and/or various components of a random data service, may include a general-purpose computer system that includes or is configured to access one or more computer-accessible media. FIG. 11 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIG. 1 through FIG. 10b, including various devices serving as entropy sources, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-accessible medium configured to store program instructions and data as described above for FIG. 1 through FIG. 10 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 3000 via I/O interface 3030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-accessible medium may include transmission media or signals such as electrical, electromagnetic, or digital signals, conveyed via a communication medium such as a network and/or a wireless link, which may be implemented via network interface 3040. Portions or all of multiple computing devices such as that illustrated in FIG. 11 may be used to implement the described functionality in various embodiments; for example, software components running on a variety of different devices and servers may collaborate to provide the functionality. In some embodiments, portions of the described functionality may be implemented using storage devices, network devices, integrated circuits, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A method, comprising:
performing, by one or more computing devices:
in response to identifying a first requirement for a pseudo-random number (PRN):
selecting a first usage context from among a plurality of different usage contexts, wherein the first usage context corresponds to the first requirement;
obtaining a baseline PRN produced at a PRN generator, wherein a first statistical property of the baseline PRN can be predicted using a technique which includes an analysis of a collection of other PRNs produced by the PRN generator;
causing one or more cryptographic transformation functions to be applied to the baseline PRN using another PRN, wherein the one or more cryptographic transformation functions meet a first security criterion based at least in part on the first usage context; and
providing a second PRN from a result of the one or more cryptographic transformation functions to fulfill the first requirement, wherein the technique able to predict the first statistical property cannot predict a corresponding statistical property of the second PRN; and
in response to identifying a second requirement for a PRN:
selecting a second usage context from among the plurality of different usage contexts;
obtaining a second baseline PRN;
providing a third PRN to fulfill the second requirement and meet a second security criterion for the second usage context, wherein the third PRN is based on the second baseline PRN having one or more cryptographic transformation functions applied different than applied for the first security criterion.

2. The method as recited in claim 1, wherein the first usage context includes an indication of an anticipated accessibility level of an artifact produced to fulfill the first requirement, wherein the anticipated accessibility level comprises one of: (a) a secret accessibility level in which access to the artifact is restricted to within a first security boundary, (b) a public accessibility level in which access to the artifact is not restricted to within a second security boundary, or (c) a semi-public accessibility level in which access to the data artifact is restricted to a plurality of security boundaries.

3. The method as recited in claim 1, wherein the first usage context is based at least in part on one or more of: (a) an identity of an entity on whose behalf the first requirement is fulfilled, (b) a particular programmatic interface invoked to indicate the first requirement, (c) an attribute of a received request indicating the first requirement, or (d) an application on behalf of which the first requirement is fulfilled.

4. The method as recited in claim 1, further comprising performing, by the one or more computing devices:
determining, based at least in part on the second usage context, that a transformation function is not to be applied to the second baseline PRN obtained for the second requirement; and
wherein the third PRN is based on the second baseline PRN having no transformation function applied.

5. The method as recited in claim 1, further comprising performing, by the one or more computing devices:
determining, based at least in part on the second usage context, that a different cryptographic transformation function is to be applied to the second baseline PRN, wherein the different cryptographic transformation function meets the second security criterion based at least in part on the second usage context; and
wherein the third PRN is based on the second baseline PRN having the different cryptographic transformation function applied, wherein the different cryptographic transformation function is different than the cryptographic transformation function applied for the first security criterion.

6. The method as recited in claim 1, wherein the causing the one or more cryptographic transformation functions to be applied to the baseline PRN comprises:
determining, based at least in part on the first usage context, a key to be used to transform the baseline PRN; and
providing the key as an input parameter of a particular cryptographic transformation function of the one or more cryptographic transformation functions.

7. A system, comprising:
one or more computing devices configured to:
determine a first usage context of a plurality of different usage contexts, wherein the first usage context corresponds to a first requirement for a pseudo-random number (PRN);
cause one or more cryptographic transformation functions to be applied to a first PRN using another PRN, wherein the one or more cryptographic transformation functions meet a security criterion based at least in part on the first usage context, wherein the first PRN is produced at a PRN generator, wherein a first statistical property of the first PRN can be predicted using a technique which includes an analysis of a collection of other PRNs produced by the PRN generator;
provide a second PRN from a result of the one or more cryptographic transformation functions to fulfill the first requirement, wherein the technique able to predict the first statistical property cannot predict a corresponding statistical property of the second PRN;
determine a second usage context of the plurality of different usage contexts, wherein the second usage context corresponds to a second requirement for a pseudo-random number (PRN); and
provide a third PRN to fulfill the second requirement and meet a second security criterion for the second usage context, wherein the third PRN is based on a second baseline PRN having one or more cryptographic transformation functions applied different than applied for the first security criterion.

8. The system as recited in claim 7, wherein the first requirement comprises a request for a pseudo-random number.

9. The system as recited in claim 8, wherein the request is received from a client of a service provider via a web services interface.

10. The system as recited in claim 7, wherein the one or more computing devices include a first computing device at which a security-enhancing intermediary is configured to identify the first requirement.

11. The system as recited in claim 7, wherein the first usage context includes an indication of an anticipated accessibility level of an artifact produced to fulfill the first requirement, wherein the anticipated accessibility level comprises one of: (a) a secret accessibility level in which access to the artifact is restricted to within a particular security boundary, (b) a public accessibility level in which access to the artifact is not restricted to within a particular security boundary, or (c) a semi-public accessibility level in which access to the data artifact is restricted to a plurality of security boundaries.

12. The system as recited in claim 7, wherein the first usage context is based at least in part on one or more of: (a) an identity of an entity on whose behalf the first requirement is fulfilled, (b) a particular programmatic interface invoked to indicate the first requirement, (c) an attribute of a received request indicating the first requirement, or (d) an application on behalf of which the first requirement is fulfilled.

13. The system as recited in claim 7, wherein the one or more computing devices are configured to:
determine, based at least in part on the second usage context, that a different cryptographic transformation function is to be applied to the second PRN, wherein the different cryptographic transformation function meets the security criterion based at least in part on the second usage context; and
wherein the third PRN is based on the second baseline PRN having the different cryptographic transformation function applied, wherein the other cryptographic transformation function is different than the cryptographic transformation function applied for the first security criterion.

14. The system as recited in claim 7, wherein to cause the one or more cryptographic transformation functions to be applied to a first PRN, the one or more computing devices are configured to:
determine, based at least in part on the first usage context, a key to be used to transform the first PRN; and
provide the key as an input parameter of a particular cryptographic transformation function of the one or more cryptographic transformation functions.

15. The system as recited in claim 14, wherein the key is based at least in part on a fourth PRN.

16. The system as recited in claim 14, wherein the key is computed after the first requirement is identified.

17. The system as recited in claim 14, wherein the key is selected from a set of pre-generated keys based at least in part on the first usage context.

18. The system as recited in claim 7, wherein
the second baseline PRN is obtained from another PRN generator selected from a plurality of PRN generators based at least in part on the second usage context.

19. A non-transitory computer-accessible storage medium storing program instructions that when executed on one or more processors:
    determine a first usage context of a plurality of different usage contexts, wherein the first usage context corresponds to a first requirement for a pseudo-random number (PRN);
    cause one or more cryptographic transformation functions to be applied to a first PRN using another PRN, wherein the one or more cryptographic transformation functions meet a security criterion based at least in part on the first usage context, wherein the first PRN is produced at a PRN generator, wherein a first statistical property of the first PRN can be predicted using a technique which includes an analysis of a collection of other PRNs produced by the PRN generator;
    provide a second PRN from a result of the one or more cryptographic transformation functions to fulfill the first requirement, wherein the technique able to predict the first statistical property cannot predict a corresponding statistical property of the second PRN;
    determine a second usage context of the plurality of different usage contexts, wherein the second usage context corresponds to a second requirement for a pseudo-random number (PRN); and
    provide a third PRN to fulfill the second requirement and meet a second security criterion for the second usage context, wherein the third PRN is based on a second baseline PRN having one or more cryptographic transformation functions applied different than applied for the first security criterion.

20. The non-transitory computer-accessible storage medium as recited in claim 19, wherein the first usage context includes an indication of an anticipated accessibility level of an artifact produced to fulfill the first requirement, wherein the anticipated accessibility level comprises one of: (a) a secret accessibility level in which access to the artifact is restricted to within a particular security boundary, (b) a public accessibility level in which access to the artifact is not restricted to within a particular security boundary, or (c) a semi-public accessibility level in which access to the data artifact is restricted to a plurality of security boundaries.

21. The non-transitory computer-accessible storage medium as recited in claim 19, wherein a particular cryptographic transformation function of the one or more cryptographic transformation functions comprises one of: (a) a function implementing the advanced encryption standard (AES) or (b) an HMAC (hash message authentication code) function.

22. The non-transitory computer-accessible storage medium as recited in claim 19, wherein the instructions when executed at the one or more processors implement a component of a random data service of a provider network.

23. The non-transitory computer-accessible storage medium as recited in claim 19, wherein the instructions when executed at the one or more processors:
    identify a third requirement for a PRN;
    cause, without determining a usage context of the third requirement, a particular cryptographic transformation function to be applied to a third baseline PRN; and
    utilize at least a result of the particular cryptographic transformation function to fulfill the third requirement.

* * * * *